(12) United States Patent
Marlowe

(10) Patent No.: US 7,489,786 B2
(45) Date of Patent: Feb. 10, 2009

(54) AUDIO DEVICE INTEGRATION SYSTEM

(76) Inventor: Ira Marlowe, 6403 Hilltop Ct., Fort Lee, NJ (US) 07024

( * ) Notice: Subject to any disclaimer, the term of this patent is extended or adjusted under 35 U.S.C. 154(b) by 820 days.

(21) Appl. No.: 10/316,961

(22) Filed: Dec. 11, 2002

(65) Prior Publication Data

US 2003/0215102 A1   Nov. 20, 2003

(51) Int. Cl.
*H04B 1/00* (2006.01)
(52) U.S. Cl. .................. 381/86; 340/825.24; 700/94
(58) Field of Classification Search .............. 381/86; 307/9.1, 10.1; 340/825.25, 825.24; 700/94; 455/345, 346; 701/36; 710/303, 304
See application file for complete search history.

(56) References Cited

U.S. PATENT DOCUMENTS

| | | | |
|---|---|---|---|
| 3,940,743 A | 2/1976 | Fitzgerald | ............... 340/172.5 |
| 4,047,162 A | 9/1977 | Dorey et al. | ............... 364/200 |

(Continued)

FOREIGN PATENT DOCUMENTS

JP         11-2733321        10/1999

(Continued)

OTHER PUBLICATIONS

"Blitzsafe Overview," from Blitzsafe.com website—"The Worldwide Leader in Aftermarket Interfaces and OEM Engineering" (1 page).

(Continued)

*Primary Examiner*—Vivian Chin
*Assistant Examiner*—Jason Kurr
(74) *Attorney, Agent, or Firm*—McCarter & English, LLP

(57) ABSTRACT

An audio device integration system is provided. One or more after-market audio devices, such as a CD player, CD changer, MP3 player, satellite receiver, DAB receiver, or the like, is integrated for use with an existing OEM or after-market car stereo system, wherein control commands can be issued at the car stereo and responsive data from the audio device can be displayed on the stereo. Control commands generated at the car stereo are received, processed, converted into a format recognizable by the audio device, and dispatched to the audio device for execution. Information from the audio device, including track, disc, song, station, time, and other information, is received, processed, converted into a format recognizable by the car stereo, and dispatched to the car stereo for display thereon. One or more auxiliary input sources can be integrated with the car stereo, and selected between using the controls of the car stereo. Both an audio device and one or more auxiliary input sources can be integrated together, and a user can select between the device or the one or more auxiliary input sources by issuing selection commands through the car stereo. A docking station is provided for docking a portable audio or video device for integration with the car stereo.

99 Claims, 21 Drawing Sheets

U.S. PATENT DOCUMENTS

| | | | | |
|---|---|---|---|---|
| 4,068,104 | A | | 1/1978 | Werth et al. ............... 179/175.3 |
| 4,091,455 | A | | 5/1978 | Woods et al. ............... 364/200 |
| 4,234,919 | A | | 11/1980 | Bruce et al. ................. 364/200 |
| 4,562,533 | A | | 12/1985 | Hodel et al. ................ 364/200 |
| 4,772,079 | A | | 9/1988 | Douglas et al. ............. 312/257 |
| 4,817,130 | A | | 3/1989 | Frimmel, Jr. ................. 379/88 |
| 4,943,978 | A | | 7/1990 | Rice ............................. 375/1 |
| RE34,536 | E | | 2/1994 | Frimmel, Jr. ................. 379/88 |
| 5,339,362 | A | | 8/1994 | Harris .......................... 381/86 |
| 5,410,675 | A | | 4/1995 | Shreve et al. ............... 395/500 |
| 5,794,164 | A | * | 8/1998 | Beckert et al. ............. 455/3.06 |
| 5,808,373 | A | | 9/1998 | Hamanishi et al. |
| 5,859,628 | A | | 1/1999 | Ross et al. |
| 6,005,488 | A | | 12/1999 | Symanov et al. ....... 340/825.56 |
| 6,052,603 | A | | 4/2000 | Kinzalow et al. |
| 6,058,319 | A | | 5/2000 | Sadler |
| 6,157,725 | A | | 12/2000 | Becker ......................... 381/86 |
| 6,163,079 | A | * | 12/2000 | Miyazaki et al. ........... 307/10.1 |
| 6,175,789 | B1 | * | 1/2001 | Beckert et al. ................ 701/33 |
| 6,278,697 | B1 | | 8/2001 | Brody et al. ............... 370/310 |
| 6,295,033 | B1 | * | 9/2001 | Chatzipetros et al. ....... 343/713 |
| 6,330,337 | B1 | | 12/2001 | Nicholson et al. ............ 381/86 |
| 6,346,917 | B1 | * | 2/2002 | Fuchs et al. ................. 343/713 |
| 6,374,177 | B1 | * | 4/2002 | Lee et al. .................... 701/200 |
| 6,389,332 | B1 | | 5/2002 | Hess et al. ..................... 701/1 |
| 6,389,560 | B1 | | 5/2002 | Chew |
| 6,396,164 | B1 | | 5/2002 | Barnea et al. ............. 307/10.1 |
| 6,529,804 | B1 | | 3/2003 | Draggon et al. |
| 6,591,085 | B1 | * | 7/2003 | Grady .......................... 455/42 |
| 6,608,399 | B2 | * | 8/2003 | McConnell et al. ........ 307/10.1 |
| 6,622,083 | B1 | | 9/2003 | Knockeart et al. |
| 6,629,197 | B1 | | 9/2003 | Bhogal et al. ............... 711/111 |
| 6,648,661 | B1 | | 11/2003 | Byrne et al. |
| 6,653,948 | B1 | * | 11/2003 | Kunimatsu et al. ..... 340/995.19 |
| 6,993,615 | B2 | * | 1/2006 | Falcon ........................ 710/303 |
| 7,288,918 | B2 | | 10/2007 | DiStefano |
| 2001/0044664 | A1 | | 11/2001 | Mueller et al. ................ 700/94 |
| 2002/0084910 | A1 | * | 7/2002 | Owens et al. .......... 340/825.24 |
| 2002/0085730 | A1 | * | 7/2002 | Holland ...................... 381/334 |
| 2002/0091863 | A1 | | 7/2002 | Schug |
| 2002/0133610 | A1 | | 9/2002 | Hadland |
| 2002/0180767 | A1 | | 12/2002 | Northway et al. |
| 2002/0197954 | A1 | | 12/2002 | Schmitt et al. |
| 2003/0007649 | A1 | | 1/2003 | Riggs .......................... 381/86 |
| 2003/0026440 | A1 | * | 2/2003 | Lazzeroni et al. ............. 381/86 |
| 2003/0053638 | A1 | * | 3/2003 | Yasuhara ...................... 381/86 |
| 2003/0086699 | A1 | | 5/2003 | Benyamin et al. ............. 386/96 |
| 2003/0156200 | A1 | | 8/2003 | Romano et al. |
| 2004/0091123 | A1 | | 5/2004 | Stark et al. |
| 2004/0145457 | A1 | | 7/2004 | Schofield et al. |
| 2004/0151327 | A1 | | 8/2004 | Marlowe |
| 2004/0266336 | A1 | | 12/2004 | Patsiokas et al. |
| 2005/0172001 | A1 | | 8/2005 | Zaner et al. |
| 2005/0239434 | A1 | | 10/2005 | Marlowe |
| 2007/0015486 | A1 | | 1/2007 | Marlowe |
| 2007/0293183 | A1 | | 12/2007 | Marlowe |

FOREIGN PATENT DOCUMENTS

| | | |
|---|---|---|
| JP | 2000-286874 | 10/2000 |
| KR | 1020010035788 | 5/2001 |
| KR | 1020010059192 | 7/2001 |
| WO | WO 2004/053722 | 6/2004 |
| WO | WO 2006/094281 | 9/2006 |
| WO | WO 2008/002954 | 1/2008 |

OTHER PUBLICATIONS

"Delphi XM SKYFI(TM) Radio," product description from XM Satellite Radio web site (2 pages).
"The New Delphi XM SKYFi Radio Add it to Any Car or Home Audio System," product description from www.xmradio.com (1 page).
Mobile Electronics: News, "Soundgate to Release New GM and BMW Interfaces," Dec. 2, 2002, ME-Mag.com (1 page).
"Welcome to Ventura Technology," from www.venturatechnology.net (2 pages).
"Ventura Technology" product descriptions from www.venturatechnoogy.net (1 page).
"Phatnoise Digital Media Players," product description from www.phatnoise.com (2 pages).
"Automedia," magazine pages from Jun./Jul. 1996 issue (2 pages).
"Automedia," magazine pages from Jan. 1998 issue (2 pages).
"Automedia," magazine pages from Feb. 1998 issue (2 pages).
"Automedia," magazine pages from Jul. 1998 issue (2 pages).
"Automedia," magazine pages from Sep. 1998 issue (2 pages).
"Automedia," magazine pages from Nov. 1998 issue (12 pages).
"Automedia," magazine pages from Feb. 1999 issue (2 pages).
"Car Stereo Review," magazine pages from Jun. 1998 issue (5 pages).
"Car Stereo Review," magazine pages from Jan. 1999 issue (2 pages).
"Car Stereo Review," magazine pages from Apr. 1999 issue (3 pages).
"Car Audio and Electronics," magazine pages from Dec. 1998 issue (2 pages).
"Car Audio and Electronics," magazine pages from Apr. 1999 issue (2 pages).
"Car Audio and Electronics," magazine pages from Jun. 1999 issue (2 pages).
"Carsound," magazine pages from May/Jun. 1999 issue (2 pages).
"Mobile Electronics Retailer," magazine pages from Aug. 1997 issue (4 pages).
"Mobile Electronics Retailer," magazine pages from Jul. 1999 issue (7 pages).
"Mobile Electronics Retailer," magazine pages from Aug. 2000 issue (2 pages).
"Cesmobile," magazine pages from Jan. 1999 issue (3 pages).
"The 12 Volt News," magazine pages from Mar. 2002 issue (2 pages).
"P.I.E. Millennium Price Guide Make the Precision Decision," Precision Interface Electronics, Inc. (6 pages).
"PIE 1999 Price Guide," Precision Interface Electronics, Inc. (4 pages).
"Design & Engineering Showcase Award," award presented to Precision Interface Electronics, Inc. for DPX Technology Digital Protocol Converter FRDN/PC-KNW, 2000 International CES.
"Design & Engineering Showcase Award," award presented to Precision Interface Electronics, Inc. for DPX Technology Digital Protocol Converter GM9/PC-KNW, 2000 International CES.
Invoice dated Jan. 28, 1998 from Precision Interface Electronics, Inc. for "Ford FCU-Sanyo Protocol," and "Ford RCU Sanyo Protocol."
Invoice dated Jan. 29, 1999 from Precision Interface Electronics, Inc. for "Ford NCU-Sanyo Protocol."
Invoice dated Apr. 26, 1999 from Precision Interface Electronics, Inc. for "9 Pin GM-Kenwood Protocol," and "10 Pin GM-Kenwood Protocol."
Invoice dated Apr. 27, 1999 from Precision Interface Electronics, Inc. for "9 Pin GM-Kenwood Protocol."
Invoice dated May 27, 1999 from Precision Interface Electronics, Inc. for "10 Pin GM-Kenwood Protocol," and "9 Pin GM-Kenwood Protocol."
Invoice dated Mar. 20, 2000 from Precision Interface Electronics, Inc. for "98-2000 Pre-Wired VW 6 DIS."
Invoice dated Mar. 20, 2000 from Precision Interface Electronics, Inc. for "98-2000 Pre-Wired VW 8 DIS," and "1998-2000 Audi to Pan 8 PC."
Invoice dated Dec. 17, 2001 from Precision Interface Electronics, Inc. for "98-02 Ford/Lincoln/Mercury."
Invoice dated Dec. 17, 2001 from Precision Interface Electronics, Inc. for "98-02 Ford/Lincoln/Mercury."
Invoice dated May 29, 2002 from Precision Interface Electronics, Inc. for "95-01 GMC/Chev/Pontiac AUX," and "98-02 Ford/Lincoln/Merc AU."
Toyota/Avox Interface Rev. Eng., Peripheral Model TIAS, created Feb. 15, 1998 (1 page).
GM/Kenwood Translator diagram, created Feb. 4, 1999 (2 pages).
Ford/Audiovox Translator diagram, created Dec. 29, 1997 (2 pages).
Component Side Silkscreen, created Dec. 31, 1997 (2 pages).
Component Xray, created Feb. 4, 1999 (2 pages).

"SoundGate, Ventura Announce Sophisticated OEM-Integration Interfaces," article from The 12 Volt News, Dec. 2002 (1 page).
"XMDirect Smart Digital Adapter," product description (3 pages).
"Breaking Protocol A Look at BlitzSafe's New DMX Protocol Converter Technology," Nov. 1998 printout from http://www.blitzsafe.com/blitz_news/news101998/body_news101998.html (2 pages).
"PIE Virtual Catalog," printout from http://web.archive.org/web/19981205005802/http:/www.pie.net/sec12sb1.htm (2 pages).
"The UniLink Project," printout from website (2 pages).
"CD Changer Interfaces," printout from http://web.archive.org/web/19991012021952/soundgate.com/cd-inter.html (1 page).
"Digital Obsessions A Spotlight on Audio Gadgetry," ZDNet Music: The PhatNoise Car Audio System, printout from http://web.archive.org/web/20000817164605/music.gamespot.com/features/phatnoise/ (3 pages).
"Bypassing and Switching With the CD4053 CMOS Analog MUX," printout from website (4 pages).
"Device Profile: Phatnoise PhatBox Car MP3 Player," Nov. 1, 2000, printout from http://techupdate.zdnet.com/techupdate/stories/main/0,14179,2649276,00.html (4 pages).
"The EZ Protoboard," printout from http://web.archive.org/web/20010613095105/http:/www.ajusd.org/~edward/ezproto/ (2 pages).
"TDIClub Forums: Reverse Engineering CD Changer Progress," Apr. 3, 2001, printout from website (3 pages).
"TDIClub Forums: Reverse Engineering CD Changer Progress Reports," Apr. 5, 2001, printout from website (8 pages).
"Multi Technology Equipment—Home of the Neo MP3 Player," printout from http://web.archive.org/web/20010413222617/ssiamerica.com/products/neo35/ (1 page).
"TDIClub Forums: Reverse Engineering CD Changer Protocol Update," Apr. 18, 2001, printout from website (3 pages).
"The Car CD Changer Interface Page," printout from website (10 pages).
"SourceForge.net: Project Info—GNUlink," printout from http://sourceforge.net/projects/gnunilink/ (3 pages).
"EZ Protoboard News," printout from website (3 pages).
"GNUnilink—For All Your AUX-IN Needs . . . ," printout from http://gnunilink.sourceforge.net/ (4 pages).
"VWCDPIC News," printout from http://web.archive.org/web/20020701101541/http:/www.ajusd.org/~edward/vwcdpic/ (8 pages).
"VWCDPIC News," printout from http://web.archive.org/web/20021009014959/http:/www.ajusd.org/~edward/vwcdpic/ (10 pages).
"Neo Car Jukebox MP3 Player," printout from website (3 pages).
"Blitz Safe Offers XM Cables for Radios," printout from website http://www.twice.com/article/CA190041.html?text=blitz+safe (2 pages).
"Integration Products May Impact Satellite Radio," printout from website http://www.twice.com/article/CA 200541.html?text=blitz+safe (3 pages).
"OEM Integration Poised for Strong Growth," printout from website http://www.twice.com/article/CA 200523.html?text=blitz+safe (3 pages).
Gilroy, Amy, "Blitz Safe Bows New SkyLink," This Week in Consumer Electronics (TWICE), Nov. 24, 2003.
Gilroy, Amy, "XM Exceeds Forecasts," This Week in Consumer Electronics (TWICE), Nov. 24, 2003.
"BlitzSafe News," http://www.blitzsafe.com/blitz_news/news031124/body_news031124.html, Nov. 24, 2003.
"XM Satellite Radio Introduces XM Direct," http://www.blitzsafe.com/blitz_news/news031117/body_news031117.html, Nov. 17, 2003.
"Digital Audio Radio," http://www.blitzsafe.com/blitz_news/news052003a/body_news052003a.html, 2003.
"BlitzSafe Winner of 2003 Autosound Grand Prix Accessories Supplier of the Year," Audiovideo Magazine, Mar. 3, 2003.
"BlitzSafe Releases World's First XM Satellite Radio, Auxillary and CD Interfaces for Landrover 'Freelander 2003'," http://www.blitzsafe.com/blitz_news/news092002b/body_news09002b.html, Sep. 16, 2002.
"BlitzSafe Releases World's First XM Satellite Radio, Auxiliary and CD Interfaces for Lexus," http://www/blitzsafe.com/blitz_news/news092002a/body_news092002a.html, Sep. 14, 2002.
Pohlmann, et al. "Satellite Radio A to Z," http://www.blitzsafe.com/blitz_news/news072002a/body_news072002a.html, 2002.
"BlitzSafe Launches XM and Six Interfaces for the 'Mini Cooper'," http://www.blitzsafe.com/blitz_news/news062002a/body_news062002a.html, Jun. 25, 2002.
"Digital Connect," Mobile Electronics, May 2002.
Solomon, Brett, "Selling 12V: OEM Integration," Dealerscope, May 2002.
"XM Xtra:," Mobile Entertainment, Apr./May 2002.
"Blitzsafe Introduces New Line of XM Digital Connect Cables," The 12 Volt News, Feb. 20, 2002.
"XM Radio Losses Mount As Do Subscribers," http://www.blitzsafe.com/blitz_news/news012002d/body_news012002d.html, Jan. 24, 2002.
"Blitzsafe Expects 3 Mil. XM Subscribers Within Three Years," http://www.blitzsafe.com/blitz_news/news012002c/body_news012002c.html., Jan. 2002.
"XM Signs Over 30,000 Subscribers in First 8 Weeks," XM Radio, Jan. 7, 2002.
BlitzSafe Unveils the First DVD Interface, Automedia, Feb. 1999.
"MBALP V.2A2 CD Changer Converter Mercedes Benz Model for 1997 and 1996," http://www.blitzsafe.com/blitz_news/pr02111996/body_pr02111996.html, Jun. 11, 1996.
"CD Changer Converter—Porsche Model Year 1996," http://www.blitzsafe.com/blitz_news/pr02071996/body_pr02071996.html. Feb. 7, 1996.
"CD Changer Converter—Mercedes Benz 1996 MY," http://www.blitzsafe.com/blitz_news/pr08231995/body_pr08231995.html, Aug. 23, 1995.
Office Action dated Aug. 8, 2006, from co-pending U.S. Appl. No. 10/732,909 (29 pages).
Interview Summary dated Dec. 15, 2006, from co-pending U.S. Appl. No. 10/732,909 (3 pages).
Interview Summary dated Jan. 3, 2007, from co-pending U.S. Appl. No. 10/732,909 (3 pages).
Office Action dated Apr. 20, 2007, from co-pending U.S. Appl. No. 10/732,909 (20 pages).
Office Action dated Oct. 3, 2007, from co-pending U.S. Appl. No. 10/732,909 (28 pages).
Interview Summary dated Oct. 26, 2007, from co-pending U.S. Appl. No. 10/732,909 (3 pages).
International Search Report of the International Searching Authority mailed May 12, 2004, issued in connection with International Patent Appln. No. PCT/US03/39493 (4 pages).
International Search Report of the International Searching Authority mailed Sep. 24, 2007, issued in connection with International Patent Appln. No. PCT/US06/008043 (4 pages).
Written Opinion of the International Searching Authority mailed Sep. 24, 2007, issued in connection with International Patent Appln. No. PCT/US06/008043 (5 pages).
International Preliminary Report on Patentability issued Oct. 16, 2007, issued in connection with International Patent Appln. No. PCT/US06/008043 (1 page).
Russian Official Action with translation, issued by the Patent Office of the Russian Federation on Dec. 24, 2007, in connection with Russian App. No. 2006101060 (21 pages).
Written Opinion, mailed by the Australian Patent Office on Aug. 28, 2007, in connection with Singapore App. No. 200601303-1 (6 pages).
International Search Report of the International Searching Authority mailed Sep. 25, 2008, issued in connection with International Patenrt Appl. No. PCT/US07/72182 (3 pages).
Written Opinion of the International Searching Authority mailed Sep. 25, 2008, issued in connection with International Patent Appl. No. PCT/US07/72182 (7 pages).
Office Action dated Jul. 9, 2008, from co-pending U.S. Appl. No. 10/732,909 (33 pages).

* cited by examiner

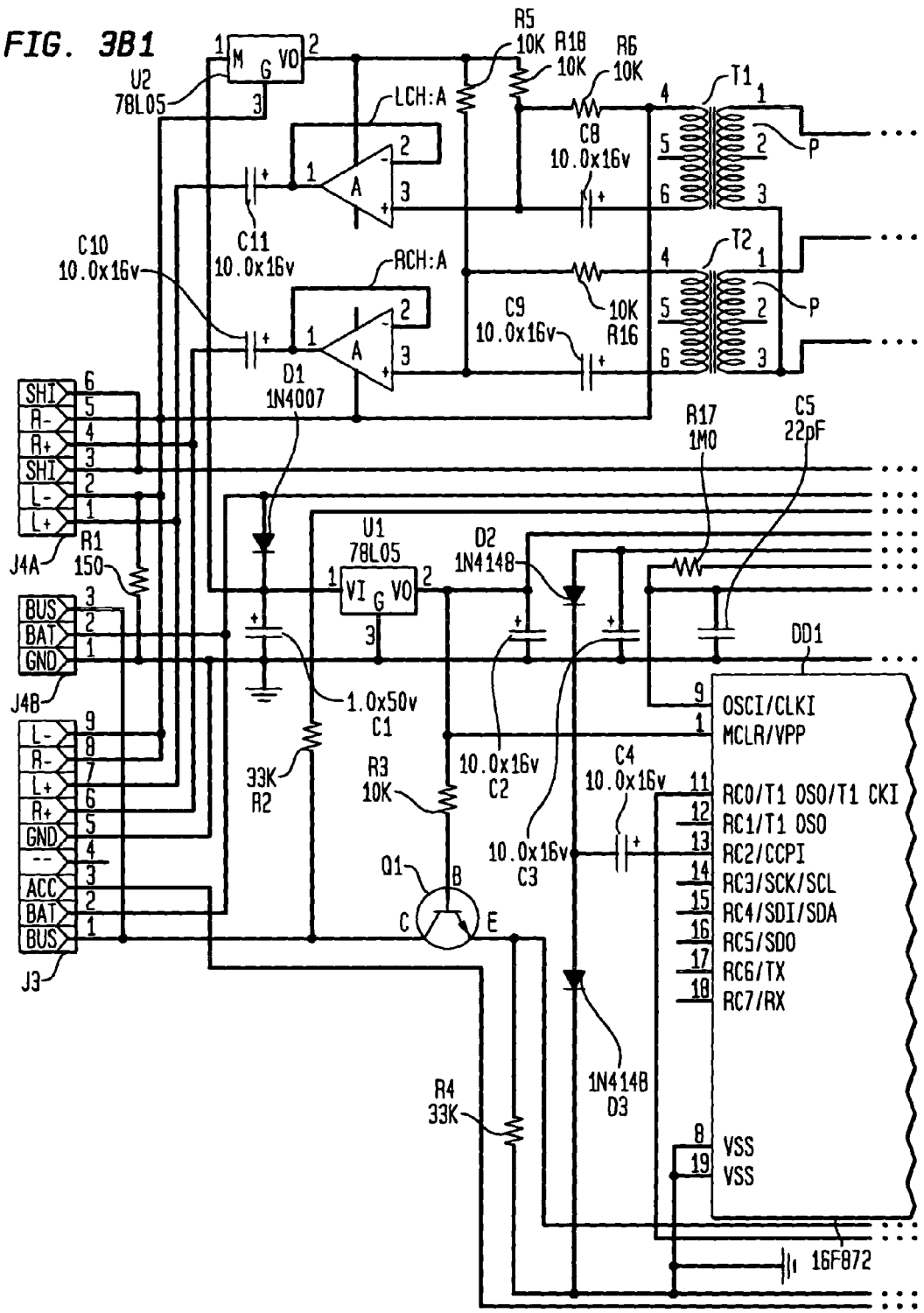
FIG. 3B1

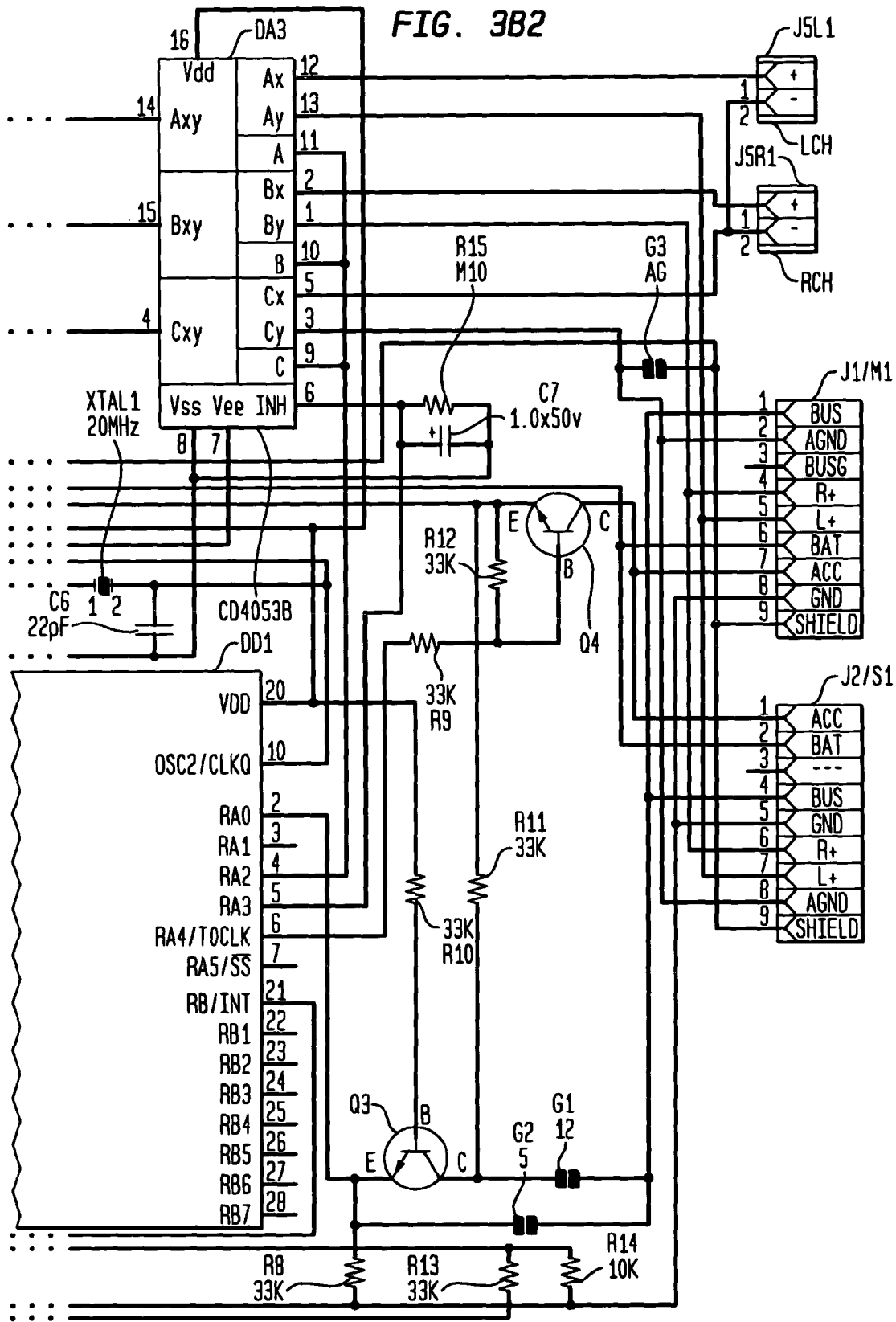
FIG. 3B2

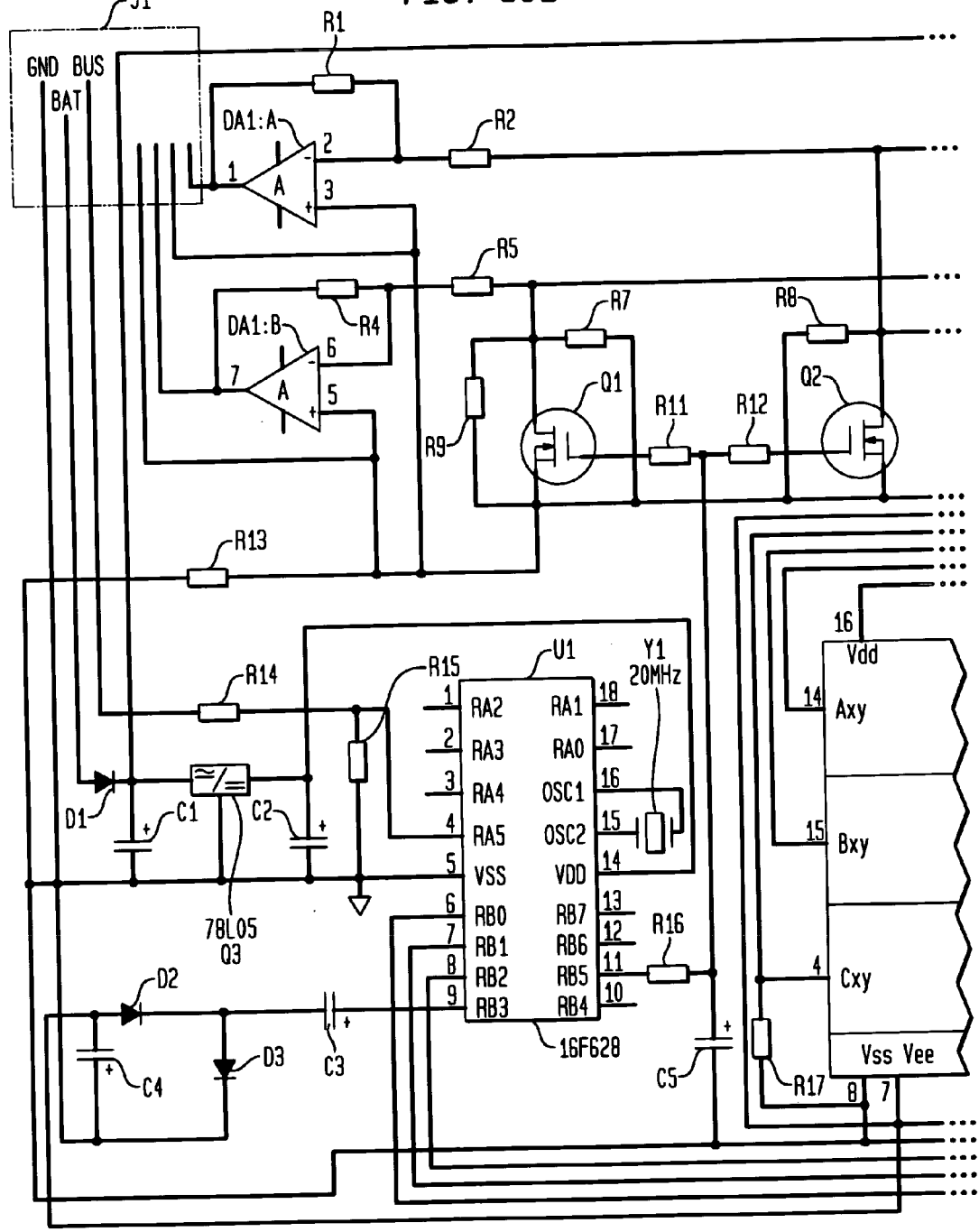
FIG. 3C1

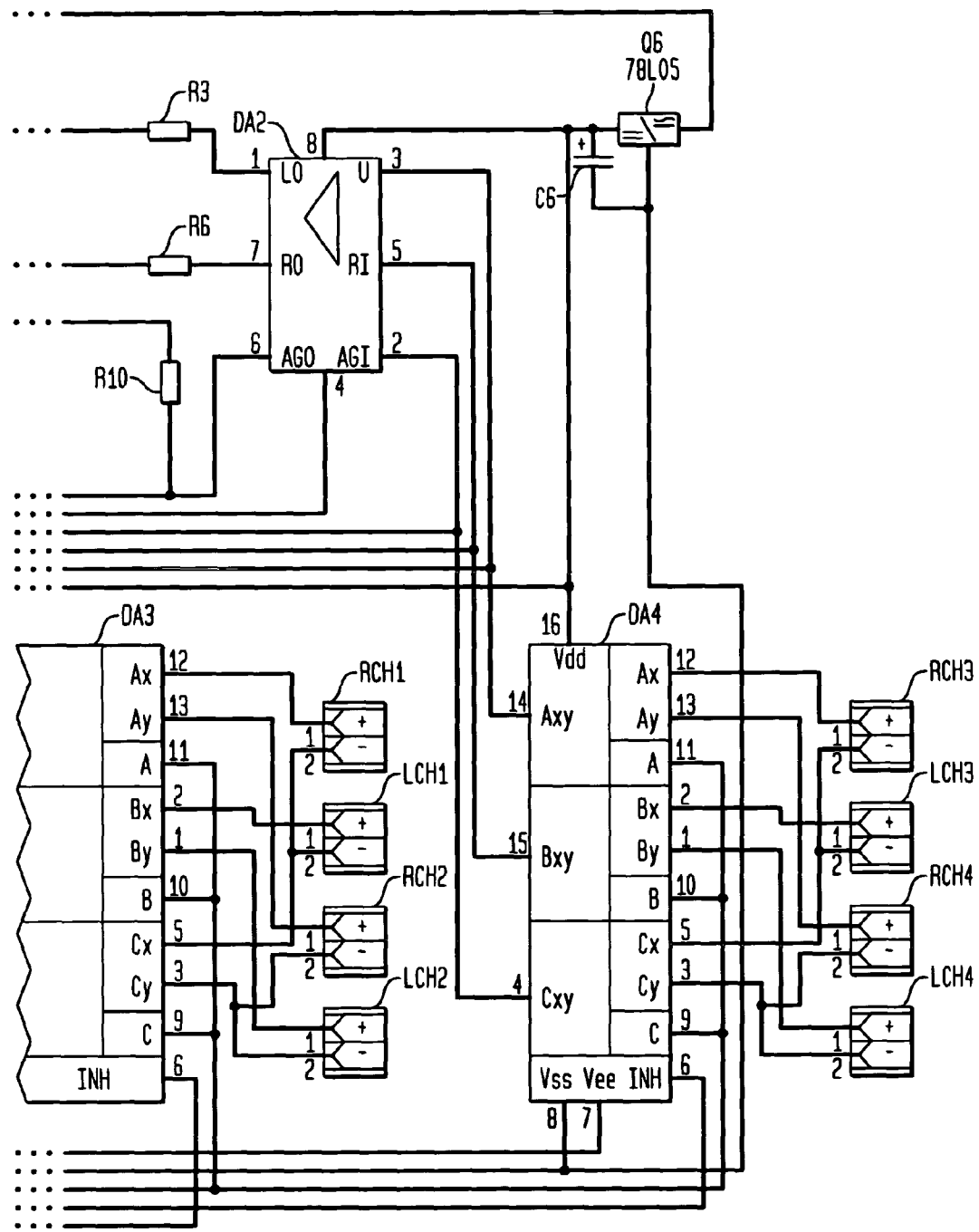
FIG. 3C2

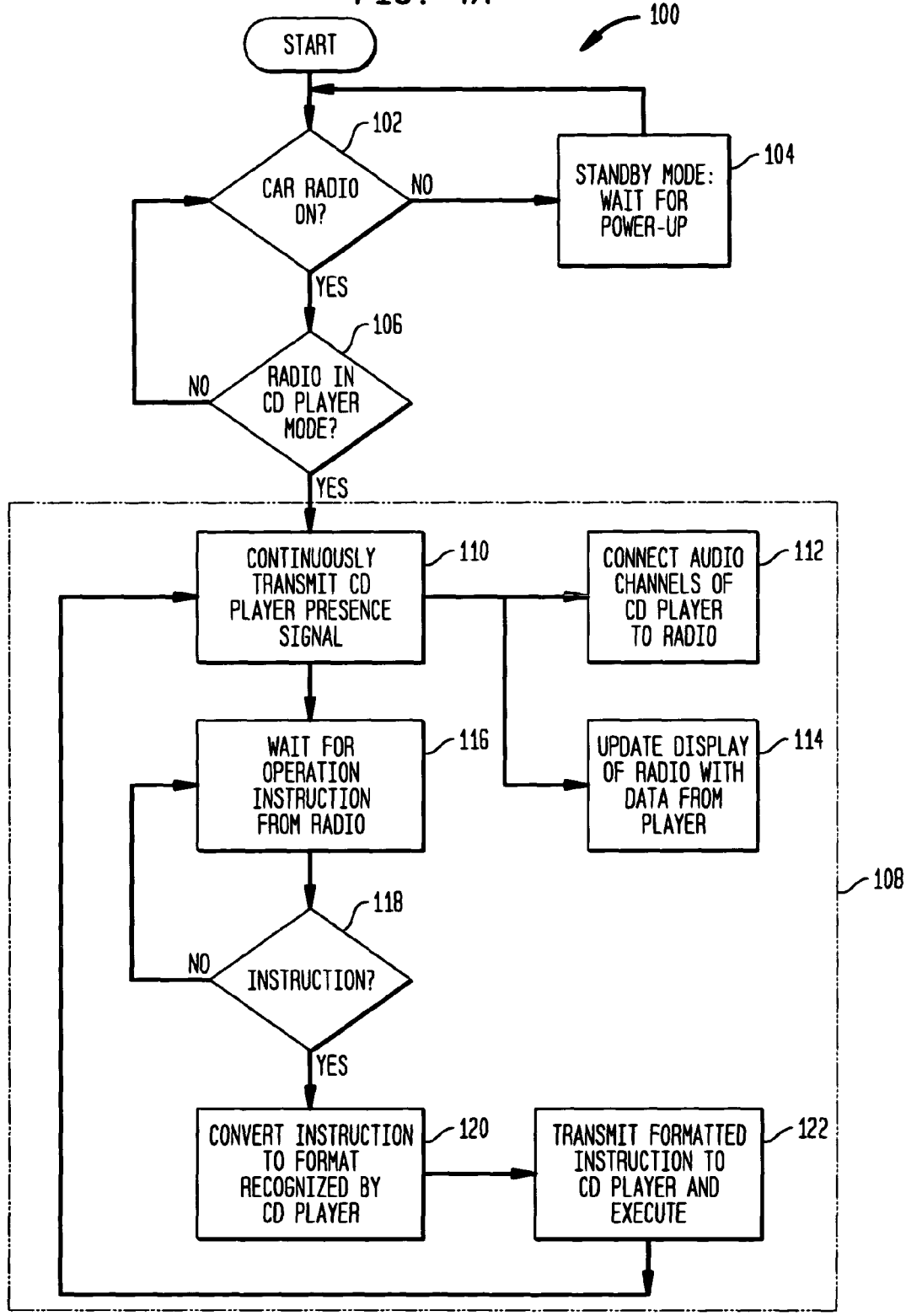

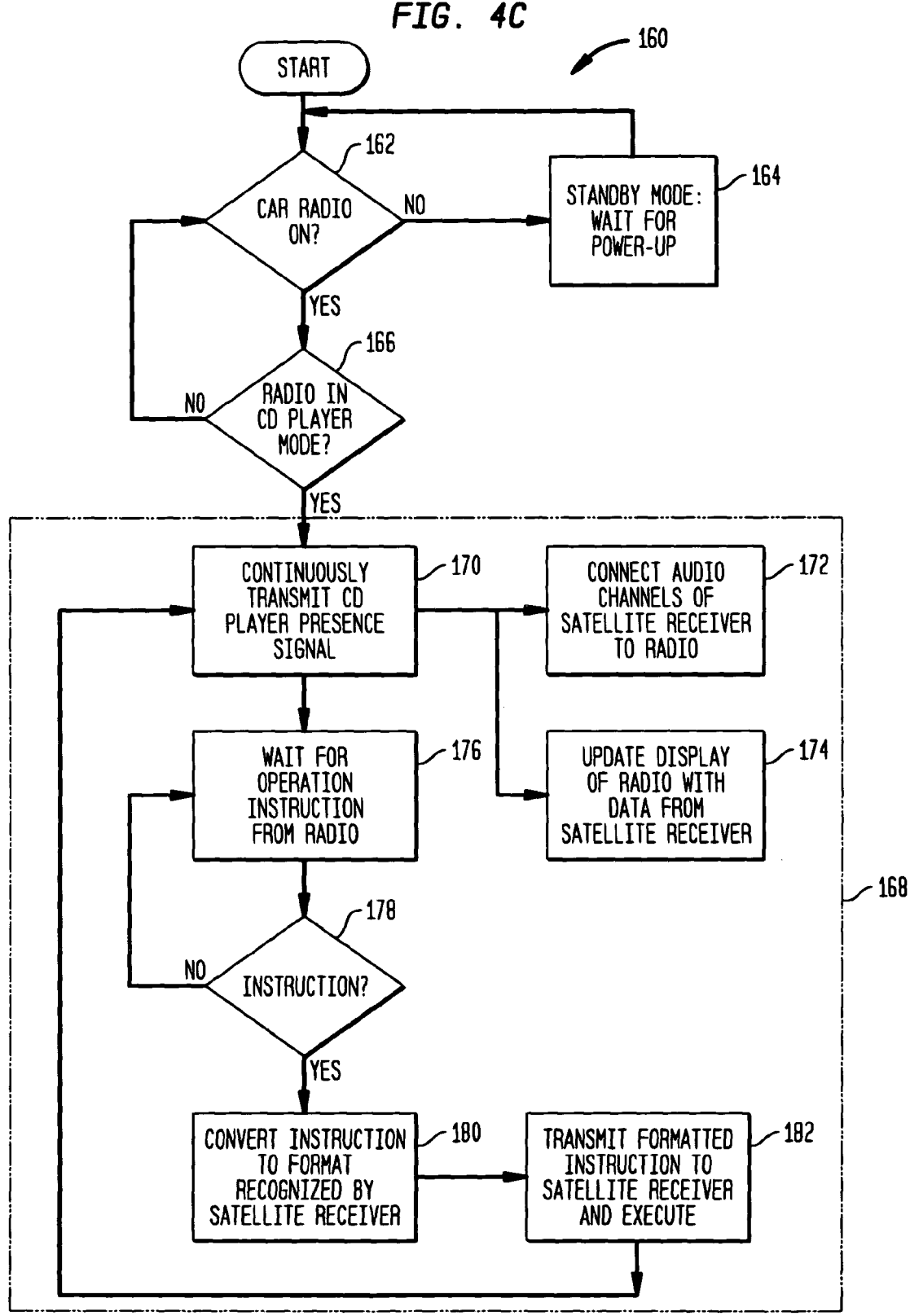

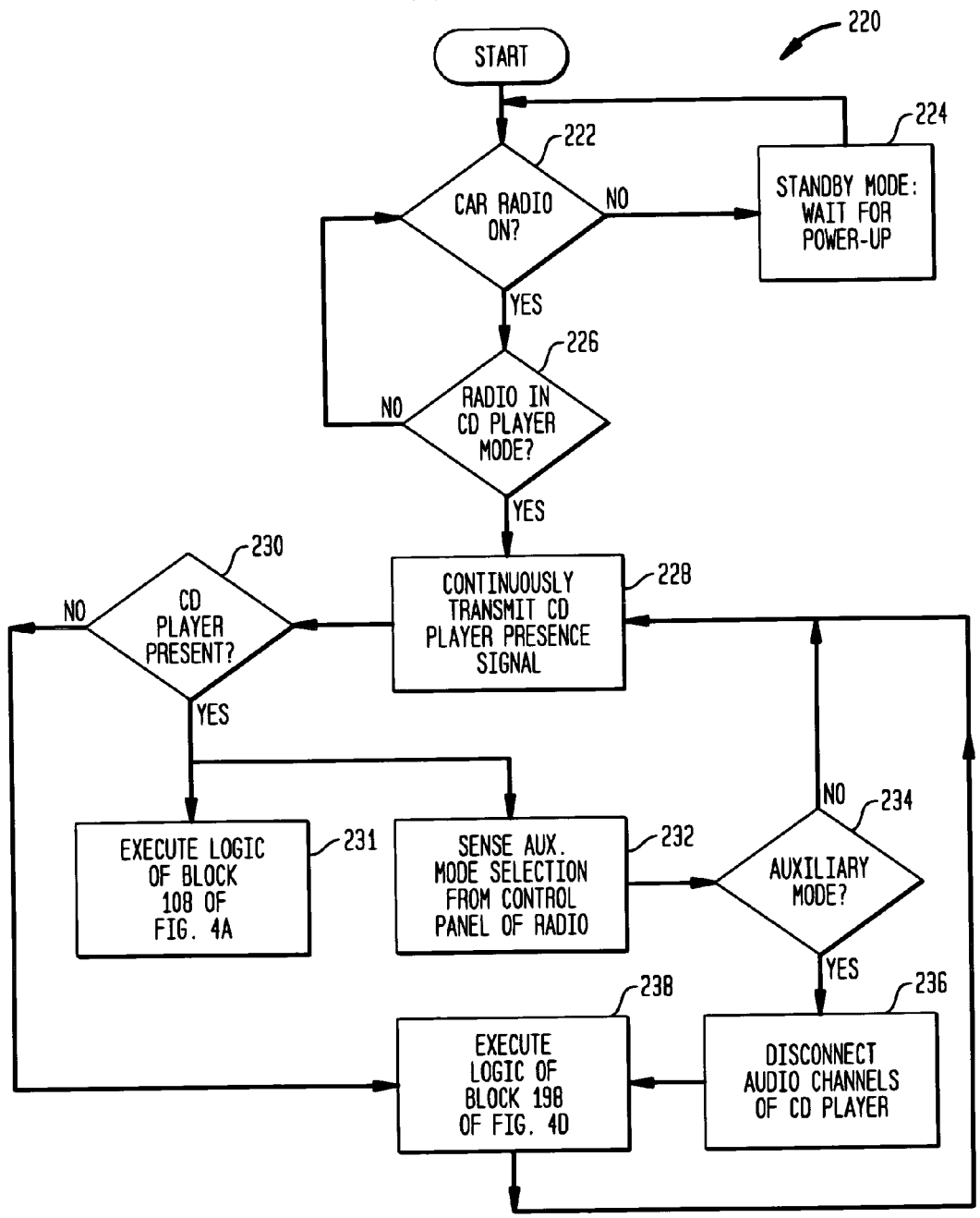

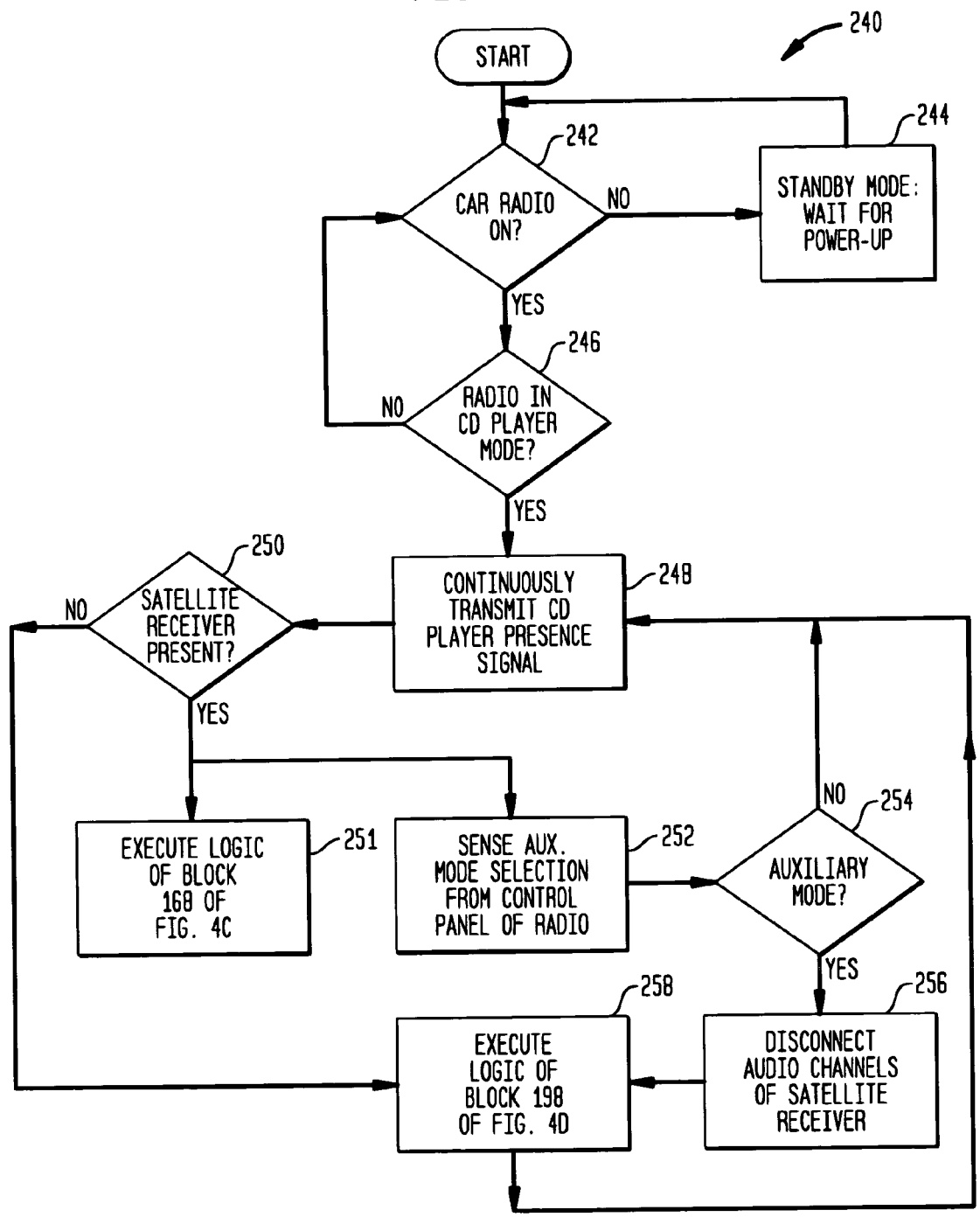

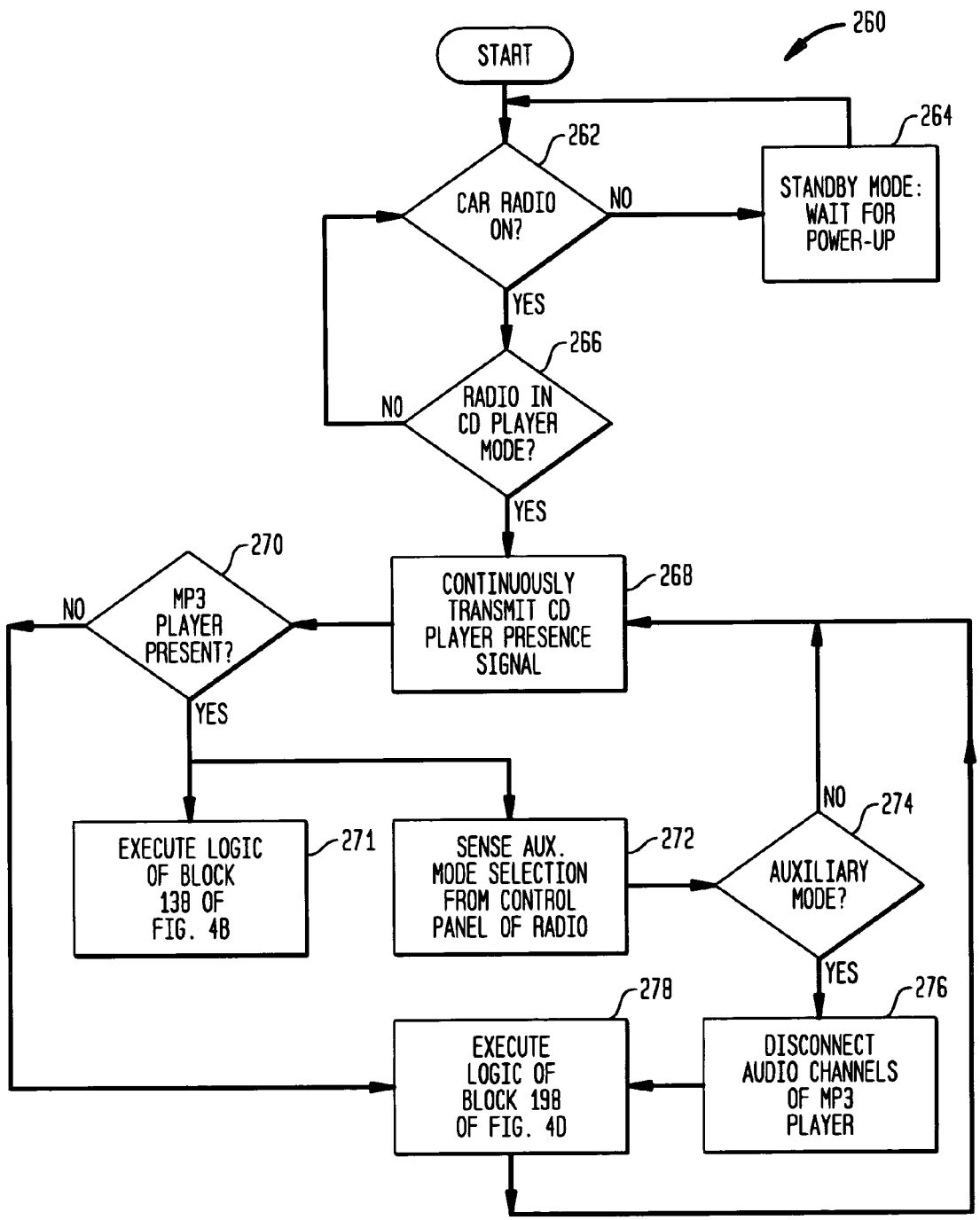

AUDIO DEVICE INTEGRATION SYSTEM

BACKGROUND OF THE INVENTION

1. Field of the Invention

The present invention relates to an audio device integration system. More specifically, the present invention relates to an audio device integration system for integrating after-market components such as satellite receivers, CD players, CD changers, MP3 players, Digital Audio Broadcast (DAB) receivers, auxiliary audio sources, and the like with factory-installed (OEM) or after-market car stereo systems.

2. Related Art

Automobile audio systems have continued to advance in complexity and the number of options available to automobile purchasers. Early audio systems offered a simple AM and/or FM tuner, and perhaps an analog tape deck for allowing cassettes, 8-tracks, and other types of tapes to be played while driving. Such early systems were closed, in that external devices could not be easily integrated therewith.

With advances in digital technology, CD players have been included with automobile audio systems. Original Equipment Manufacturers (OEMs) often produce car stereos having CD players and/or changers for allowing CDs to be played while driving. However, such systems often include proprietary buses and protocols that do not allow after-market audio systems, such as satellite receivers (e.g., XM satellite tuners), digital audio broadcast (DAB) receivers, MP3 players, CD changers, auxiliary input sources, and the like, to be easily integrated therewith. Thus, automobile purchasers are frequently forced to either entirely replace the OEM audio system, or use same throughout the life of the vehicle or the duration of ownership. Even if the OEM radio is replaced with an after-market radio, the after-market radio also frequently is not operable with an external device.

A particular problem with integrating after-market audio systems with existing car stereos is that signals generated by the car stereo is in a proprietary format, and is not capable of being processed by the after-market system. Additionally, signals generated by the after-market system are also in a proprietary format that is not recognizable by the car stereo. Thus, in order to integrate after-market systems with car stereos, it is necessary to convert signals between such systems.

It known in the art to provide one or more expansion modules for OEM and after-market car stereos for allowing external audio products to be integrated with the car stereo. However, such expansion modules only operate with and allow integration of external audio products manufactured by the same manufacturer as the OEM/after-market car stereo. For example, a satellite receiver manufactured by PIONEER, Inc., cannot be integrated with an OEM car radio manufactured by TOYOTA or an after-market car radio manufactured by CLARION, Inc. Thus, existing expansion modules only serve the limited purpose of integrating equipment by the same manufacturer as the car stereo. Thus, it would be desirable to provide an integration system that allows any audio device of any manufacture to be integrated with any OEM or after-market radio system.

Moreover, it would be desirable to provide an integration system that not only achieves integration of various audio devices that are alien to a given OEM or after-market stereo system, but also allows for information to be exchanged between the after-market device and the car stereo. For example, it would be desirable to provide a system wherein station, track, time, and song information can be retrieved from the after-market device, formatted, and transmitted to the car stereo for display thereby, such as at an LCD panel of the car stereo. Such information could be transmitted and displayed on both hardwired radio systems (e.g., radios installed in dashboards or at other locations within the car), or integrated for display on one or more software or graphically-driven radio systems operable with graphical display panels. Additionally, it would be desirable to provide an audio integration system that allows a user to control more than one device, such as a CD or satellite receiver and one or more auxiliary sources, and to quickly and conveniently switch between same using the existing controls of the car stereo.

Accordingly, the present invention addresses these needs by providing an audio integration system that allows a plurality of audio devices, such as CD players, CD changers, MP3 players, satellite receivers, DAB receivers, auxiliary input sources, or a combination thereof, to be integrated into existing car stereos while allowing information to be displayed on, and control to be provided from, the car stereo.

SUMMARY OF THE INVENTION

The present invention relates to an audio device integration system. One or more after-market audio devices, such as a CD player, CD changer, MP3 player, satellite receiver (e.g., XM tuner), digital audio broadcast (DAB) receiver, or auxiliary input source, can be connected to and operate with an existing stereo system in an automobile, such as an OEM car stereo system or an after-market car stereo system installed in the automobile. The integration system connects to and interacts with the car stereo at any available port of the car stereo, such as a CD input port, a satellite input, or other known type of connection. If the car stereo system is an after-market car stereo system, the present invention generates a signal that is sent to the car stereo to keep same in an operational state and responsive to external data and signals. Commands generated at the control panel are received by the present invention and converted into a format recognizable by the after-market audio device. The formatted commands are executed by the audio device, and audio therefrom is channeled to the car stereo. Information from the audio device is received by the present invention, converted into a format recognizable by the car stereo, and forwarded to the car stereo for display thereby. The formatted information could include information relating to a CD or MP3 track being played, channel, song, and artist information from a satellite receiver or DAB receiver, or video information from one or more external devices connected to the present invention. The information can be presented as one or more menus, textual, or graphical prompts for display on an LCD display of the radio, allowing interaction with the user at the radio. A docking port is provided for allowing portable external audio devices to be connected to the interface of the present invention.

In an embodiment of the present invention, a dual-input device is provided for integrating both an external audio device and an auxiliary input with an OEM or after-market car stereo. The user can select between the external audio device and the auxiliary input using the controls of the car stereo. The invention can automatically detect the type of device connected to the auxiliary input, and integrate same with the car stereo.

In another embodiment of the present invention, an interface is provided for integrating a plurality of auxiliary input sources with an existing car stereo system. A user can select between the auxiliary sources using the control panel of the car stereo. One or more after-market audio devices can be integrated with the auxiliary input sources, and a user can switch between the audio device and the auxiliary input sources using the car stereo. Devices connected to the auxiliary input sources are inter-operable with the car stereo, and are capable of exchanging commands and data via the interface.

BRIEF DESCRIPTION OF THE DRAWINGS

These and other important objects and features of the invention will be apparent from the following Detailed Description of the Invention, taken in connection with the accompanying drawings, in which:

FIG. 3b is a circuit diagram showing a device according to the present invention for integrating both a CD player and an auxiliary input source with a car radio, wherein the CD player and the auxiliary input are switchable by a user.

FIG. 3c is a circuit diagram showing a device according to the present invention for integrating a plurality of auxiliary input sources with a car radio.

FIG. 4a is a flowchart showing processing logic according to the present invention for integrating a CD player with a car radio.

FIG. 4c is a flowchart showing processing logic according to the present invention for integrating a satellite receiver with a car radio.

FIG. 4e is a flowchart showing processing logic according to the present invention for integrating a CD player and one or more auxiliary input sources with a car radio.

FIG. 4f is a flowchart showing processing logic according to the present invention for integrating a satellite or DAB receiver and one or more auxiliary input sources with a car radio.

FIG. 4g is a flowchart showing processing logic according to the present invention for integrating a MP3 player and one or more auxiliary input sources with a car stereo.

FIG. 7b is an end view of the docking station of FIG. 7a.

DETAILED DESCRIPTION OF THE INVENTION

Figure 1:
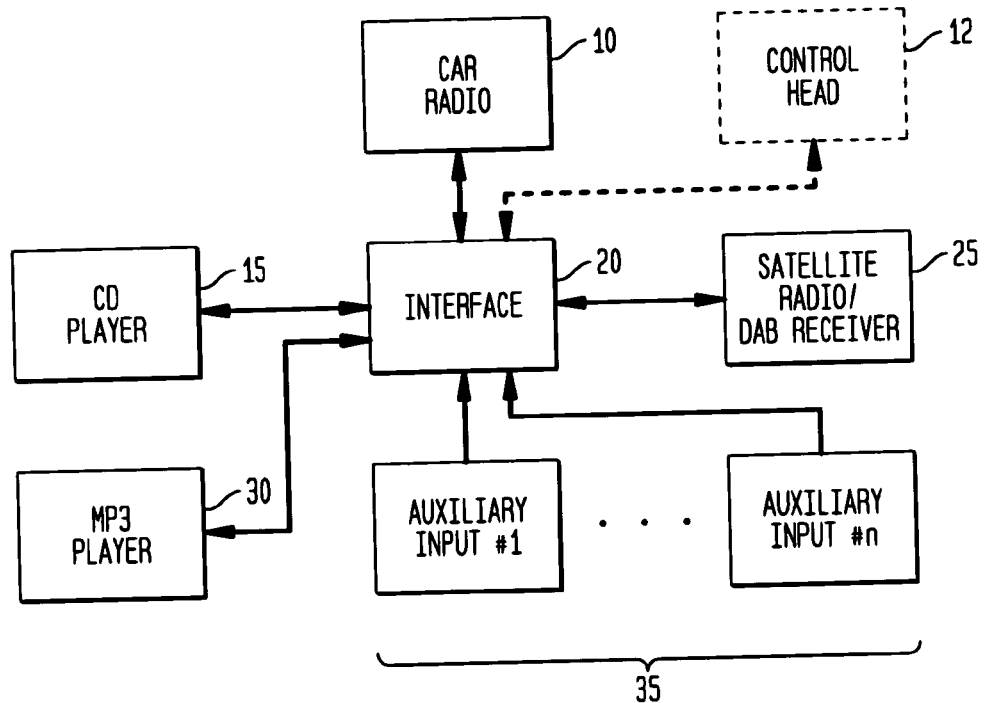
FIG. 1 is a block diagram showing the audio device integration system of the present invention.

The present invention relates to an audio device integration system. One or more after-market audio devices, such as a CD player, CD changer, MP3 player, satellite receiver, digital audio broadcast (DAB) receiver, or the like, can be integrated with an existing car radio, such as an OEM car stereo or an after-market car stereo. Control of the audio device is enabled using the car radio, and information from the audio device, such as channel number, channel name, artist, track, time, and song information, is retrieved form the audio device, processed, and forwarded to the car radio for display thereon. The information channeled to the car radio can include video from the external device, as well as graphical and menu-based information. A user can review and interact with information via the car stereo. Commands from the car radio are received, processed by the present invention into a format recognizable by the audio device, and transmitted thereto for execution. One or more auxiliary input channels can be integrated by the present invention with the car radio. The user can switch between one or more audio devices and one or more auxiliary input channels using the control panel buttons of the car radio.

As used herein, the term "integration" or "integrated" is intended to mean connecting one or more external devices or inputs to an existing car radio or stereo via an interface, processing and handling signals and audio channels, allowing a user to control the devices via the car stereo, and displaying data from the devices on the radio. Thus, for example, integration of a CD player with a car stereo system allows for the CD player to be remotely controlled via the control panel of the stereo system, and data from the CD player to be sent to the display of the stereo. Of course, control of audio devices can be provided at locations other than the control panel of the radio without departing from the spirit or scope of the present invention. Further, as used herein, the term "inter-operable" is intended to mean allowing the external audio device to receive and process commands that have been formatted by the interface of the present invention, as well as allowing a car stereo to display information that is generated by the external audio device and processed by the present invention. Additionally, by the term "inter-operable," it is meant allowing a device that is alien to the environment of an existing OEM or after-market car stereo to be utilized thereby.

Also, as used herein, the terms "car stereo" and "car radio" are used interchangeably and are intended to include all presently existing car stereos and radios, such as physical devices that are present at any location within a vehicle, in addition to software and/or graphically-or display-driven receivers. An example of such a receiver is a software-driven receiver that operates on a universal LCD panel within a vehicle and is operable by a user via a graphical user interface displayed on the universal LCD panel. Further, any future receiver, whether a hardwired or a software/graphical receiver operable on one or more displays, is considered within the definition of the terms "car stereo" and "car radio," as used herein, and is within the spirit and scope of the present invention.

FIG. 1 is a block diagram showing the audio device integration (or interface) system of the present invention, generally indicated at 20. A plurality of devices and auxiliary inputs can be connected to the interface 20, and integrated with an OEM or after-market car radio 10. A CD player or changer 15 can be integrated with the radio 10 via interface 20. A satellite radio or DAB receiver 25, such as an XM radio satellite receiver or DAB receiver known in the art, could be integrated with the radio 10, via the interface 20. Further, an MP3 player could also be integrated with the radio 10 via interface 20. Moreover, a plurality of auxiliary input sources, illustratively indicated as auxiliary input sources 35 (comprising input sources 1 through n, n being any number), could also be integrated with the car radio 10 via interface 20. Optionally, a control head 12, such as that commonly used with after-market CD changers and other similar devices, could be integrated with the car radio 10 via interface 20, for controlling any of the car radio 10, CD player/changer 15, satellite/DAB receiver 25, MP3 player 30, and auxiliary input sources 35. Thus, as can be readily appreciated, the interface 20 of the present invention allows for the integration of a multitude of devices and inputs with an OEM or after-market car radio or stereo.

Figure 2A:
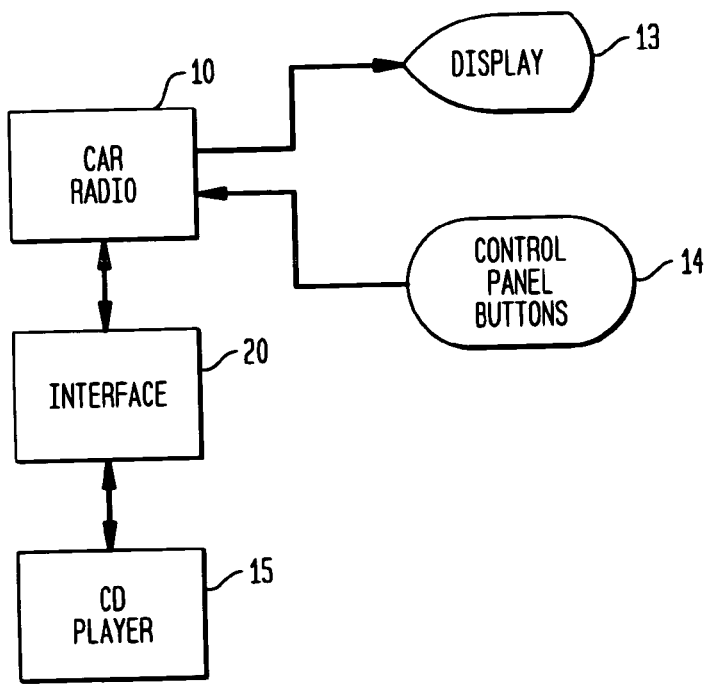
FIG. 2a is a block diagram showing an alternate embodiment of the audio device integration system of the present invention, wherein a CD player is integrated with a car radio.

FIG. 2a is a block diagram of an alternate embodiment of the audio device interface system of the present invention, wherein a CD player/changer 15 is integrated with an OEM or after-market car radio 10. The CD player 15 is electrically connected with the interface 20, and exchanges data and audio signals therewith. The interface 20 is electrically connected with the car radio 10, and exchanges data and audio signals therewith. In a preferred embodiment of the present invention, the car radio 10 includes a display 13 (such as an alphanumeric, electroluminescent display) for displaying information, and a plurality of control panel buttons 14 that normally operate to control the radio 10. The interface 20 allows the CD player 15 to be controlled by the control buttons 14 of the radio 10. Further, the interface 20 allows information from the CD player 15, such as track, disc, time, and song information, to be retrieved therefrom, processed and formatted by the interface 20, sent to the display 13 of the radio 10.

Importantly, the interface 20 allows for the remote control of the CD player 15 from the radio 10 (e.g., the CD player 15 could be located in the trunk of a car, while the radio 10 is mounted on the dashboard of the car). Thus, for example, one or more discs stored within the CD player 15 can be remotely selected by a user from the radio 10, and tracks on one or more of the discs can be selected therefrom. Moreover, standard CD operational commands, such as pause, play, stop, fast forward, rewind, track forward, and track reverse (among other commands) can be remotely entered at the control panel buttons 14 of the radio 10 for remotely controlling the CD player 15.

Figure 2B:
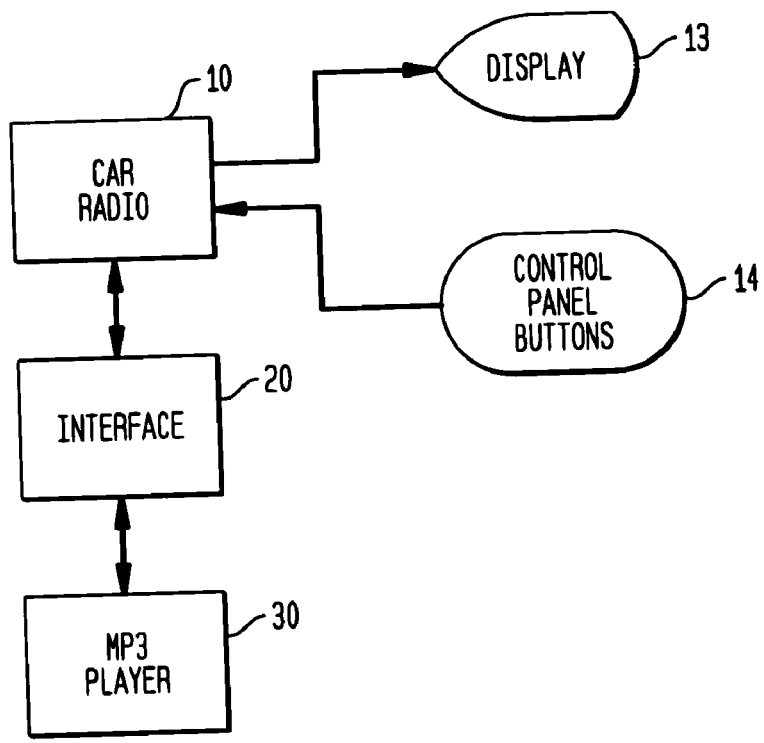
FIG. 2b is a block diagram showing an alternate embodiment of the audio device integration system of the present invention, wherein a MP3 player is integrated with a car radio.

FIG. 2b is a block diagram showing an alternate embodiment of the present invention, wherein an MP3 player 30 is integrated with an OEM or after-market car radio 10 via interface 20. As mentioned earlier, the interface 20 of the present invention allows for a plurality of disparate audio devices to be integrated with an existing car radio for use therewith. Thus, as shown in FIG. 2b, remote control of the MP3 player 30 via radio 10 is provided for via interface 20. The MP3 player 30 is electronically interconnected with the interface 20, which itself is electrically interconnected with the car radio 10. The interface 20 allows data and audio signals to be exchanged between the MP3 player 30 and the car radio 10, and processes and formats signals accordingly so that instructions and data from the radio 10 are processable by the MP3 player 30, and vice versa. Operational commands, such as track selection, pause, play, stop, fast forward, rewind, and other commands, are entered via the control panel buttons 14 of car radio 10, processed by the interface 20, and formatted for execution by the MP3 player 30. Data from the MP3 player, such as track, time, and song information, is received by the interface 20, processed thereby, and sent to the radio 10 for display on display 13. Audio from the MP3 player 30 is selectively forwarded by the interface 20 to the radio 10 for playing.

Figure 2C:
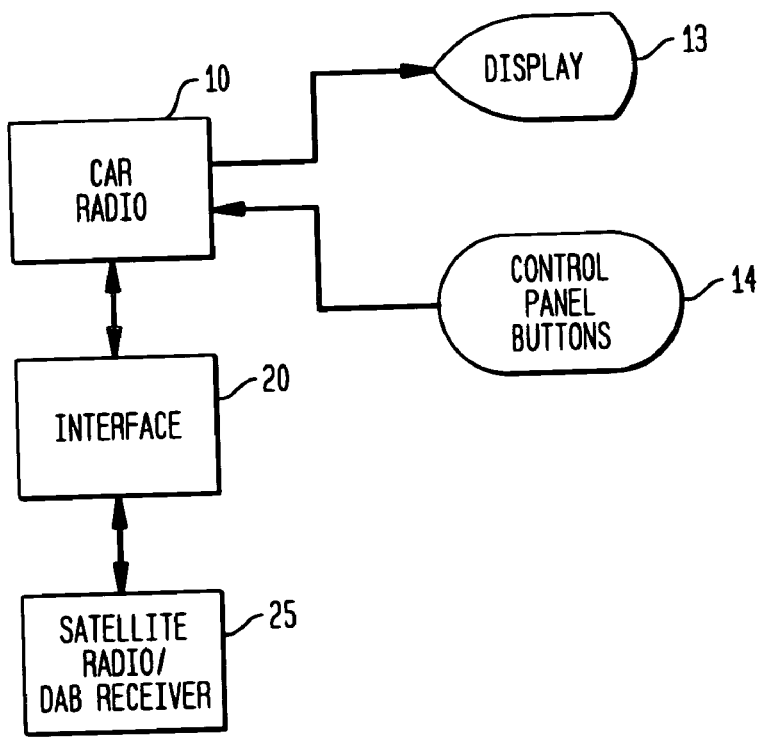
FIG. 2c is a block diagram showing an alternate embodiment of the audio device integration system of the present invention, wherein a satellite or DAB receiver is integrated with a car radio.

FIG. 2c is a block diagram showing an alternate embodiment of the present invention, wherein a satellite receiver or DAB receiver 25 is integrated with an OEM or after-market car radio 10 via the interface 20. Satellite/DAB receiver 25 can be any satellite radio receiver known in the art, such as XM or Sirius, or any DAB receiver known in the art. The satellite/DAB receiver 25 is electrically interconnected with the interface 20, which itself is electrically interconnected with the car radio 10. The satellite/DAB receiver 25 is remotely operable by the control panel buttons 14 of the radio 10. Commands from the radio 10 are received by the interface 20, processed and formatted thereby, and dispatched to the satellite/DAB receiver 25 for execution thereby. Information from the satellite/DAB receiver 25, including time, station, and song information, is received by the interface 20, processed, and transmitted to the radio 10 for display on display 13. Further, audio from the satellite/DAB receiver 25 is selectively forwarded by the interface 20 for playing by the radio 10.

Figure 2D:
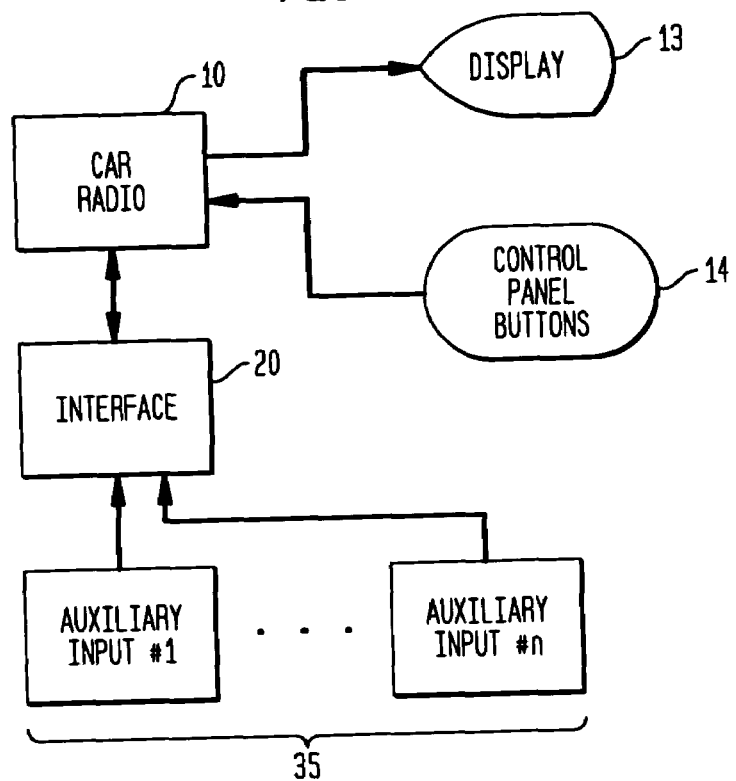
FIG. 2d is a block diagram showing an alternate embodiment of the audio device integration system of the present invention, wherein a plurality of auxiliary input sources are integrated with a car radio.

FIG. 2d is a block diagram showing an alternate embodiment of the present invention, wherein one or more auxiliary input sources 35 are integrated with an OEM or after-market car radio 10. The auxiliary inputs 35 can be connected to analog sources, or can be digitally coupled with one or more audio devices, such as after-market CD players, CD changers, MP3 players, satellite receivers, DAB receivers, and the like, and integrated with an existing car stereo. Preferably, four auxiliary input sources are connectable with the interface 20, but any number of auxiliary input sources could be included. Audio from the auxiliary input sources 35 is selectively forwarded to the radio 10 under command of the user. As will be discussed herein in greater detail, a user can select a desired input source from the auxiliary input sources 35 by depressing one or more of the control panel buttons 14 of the radio 10. The interface 20 receives the command initiated from the control panel, processes same, and connects the corresponding input source from the auxiliary input sources 35 to allow audio therefrom to be forwarded to the radio 10 for playing. Further, the interface 20 determines the type of audio devices connected to the auxiliary input ports 35, and integrates same with the car stereo 10.

As mentioned previously, the present invention allows one or more external audio devices to be integrated with an existing OEM or after-market car stereo, along with one or more auxiliary input sources, and the user can select between these sources using the controls of the car stereo. Such "dual input" capability allows operation with devices connected to either of the inputs of the device, or both. Importantly, the device can operate in "plug and play" mode, wherein any device connected to one of the inputs is automatically detected by the present invention, its device type determined, and the device automatically integrated with an existing OEM or after-market car stereo. Thus, the present invention is not dependent any specific device type to be connected therewith to operate. For example, a user can first purchase a CD changer, plug same into a dual interface, and use same with the car stereo. At a point later in time, the user could purchase an XM tuner, plug same into the device, and the tuner will automatically be detected and integrated with the car stereo, allowing the user to select from and operate both devices from the car stereo. It should be noted that such plug and play capability is not limited to a dual input device, but is provided for in every embodiment of the present invention. The dual-input configuration of the preset invention is illustrated in FIGS. 2e-2h and described below.

Figure 2E:
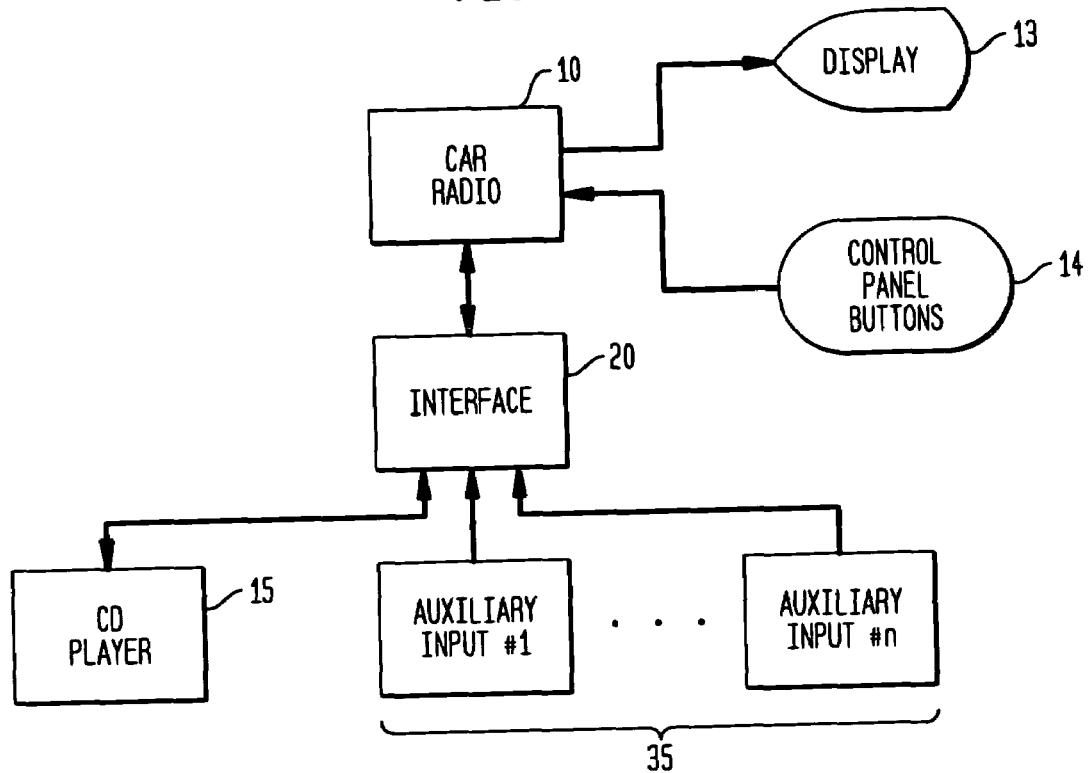
FIG. 2e is a block diagram showing an alternate embodiment of the audio device integration system of the present invention, wherein a CD player and a plurality of auxiliary input sources are integrated with a car radio.

FIG. 2e is a block diagram showing an alternate embodiment of the present invention, wherein an external CD player/changer 15 and one or more auxiliary input sources 35 are integrated with an OEM or after-market car stereo 10. Both the CD player 15 and one or more of the auxiliary input sources 35 are electrically interconnected with the interface 20, which, in turn, is electrically interconnected to the radio 10. Using the controls 14 of the radio 10, a user can select between the CD player 15 and one or more of the inputs 35 to selectively channel audio from these sources to the radio. The command to select from one of these sources is received by the interface 20, processed thereby, and the corresponding source is channeled to the radio 10 by the interface 20. As will be discussed later in greater detail, the interface 20 contains internal processing logic for selecting between these sources.

Figure 2F:
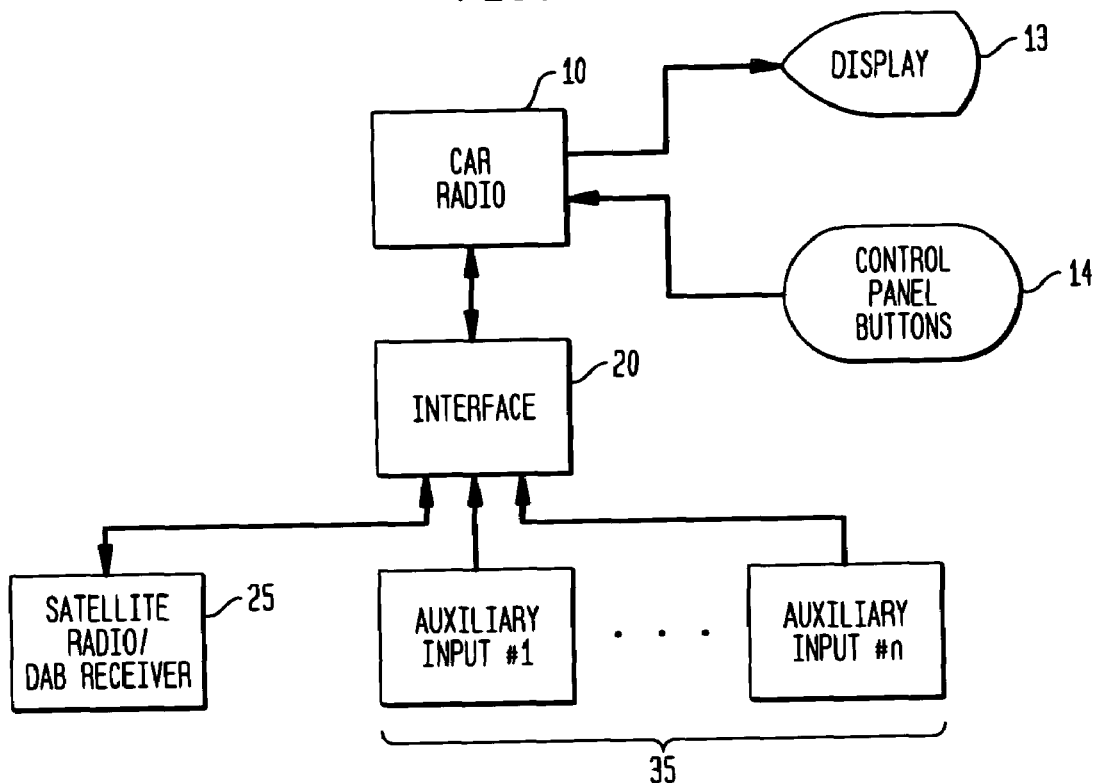
FIG. 2f is a block diagram showing an alternate embodiment of the present invention, wherein a satellite or DAB receiver and a plurality of auxiliary input source are integrated with a car radio.

FIG. 2f is a block diagram of an alternate embodiment of the present invention, wherein a satellite receiver or DAB receiver and one or more auxiliary input sources are integrated by the interface 20 with an OEM or after-market car radio 10. Similar to the embodiment of the present invention illustrated in FIG. 2e and described earlier, the interface 20 allows a user to select between the satellite/DAB receiver 25 and one or more of the auxiliary input sources 35 using the controls 14 of the radio 10. The interface 20 contains processing logic, described in greater detail below, for allowing switching between the satellite/DAB receiver 25 and one or more of the auxiliary input sources 35.

Figure 2G:
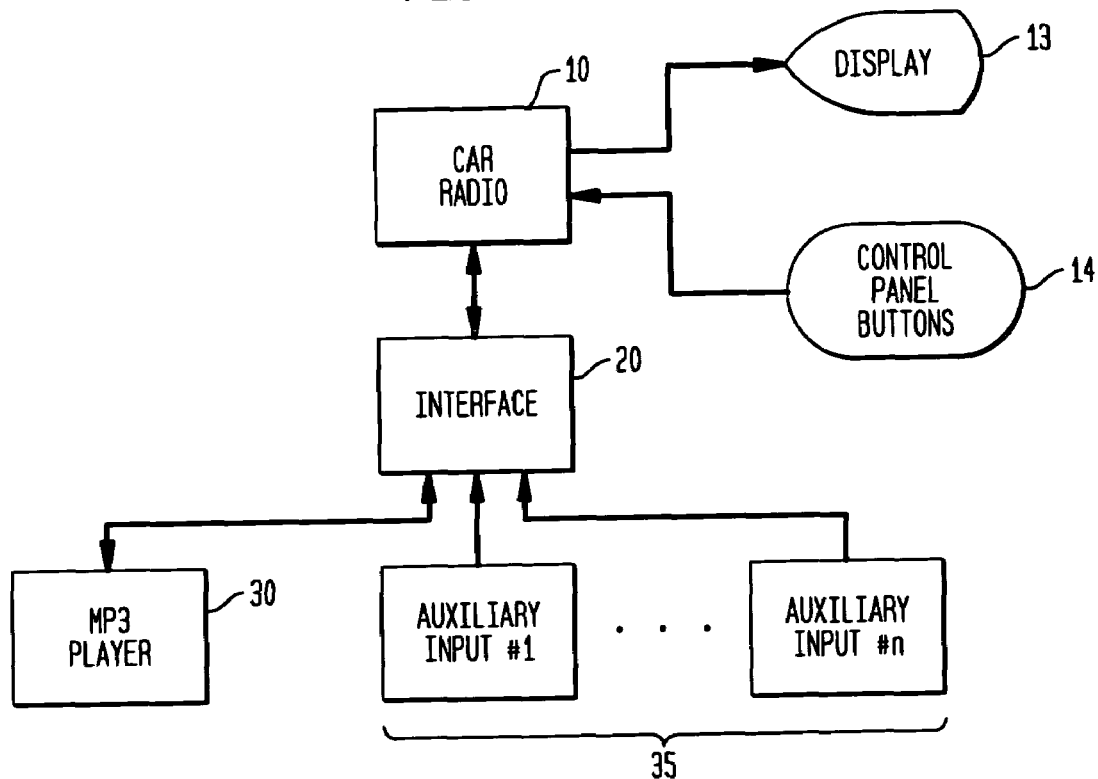
FIG. 2g is a block diagram showing an alternate embodiment of the present invention, wherein a MP3 player and a plurality of auxiliary input sources are integrated with a car radio.

FIG. 2g is a block diagram of an alternate embodiment of the present invention, wherein a MP3 player 30 and one or more auxiliary input sources 35 are integrated by the interface 20 with an OEM or after-market car radio 10. Similar to the embodiments of the present invention illustrated in FIGS. 2e and 2f and described earlier, the interface 20 allows a user to select between the MP3 player 30 and one or more of the auxiliary input sources 35 using the controls 14 of the radio 10. The interface 20 contains processing logic, as will be discussed later in greater detail, for allowing switching between the MP3 player 30 and one or more of the auxiliary input sources 35.

Figure 2H:
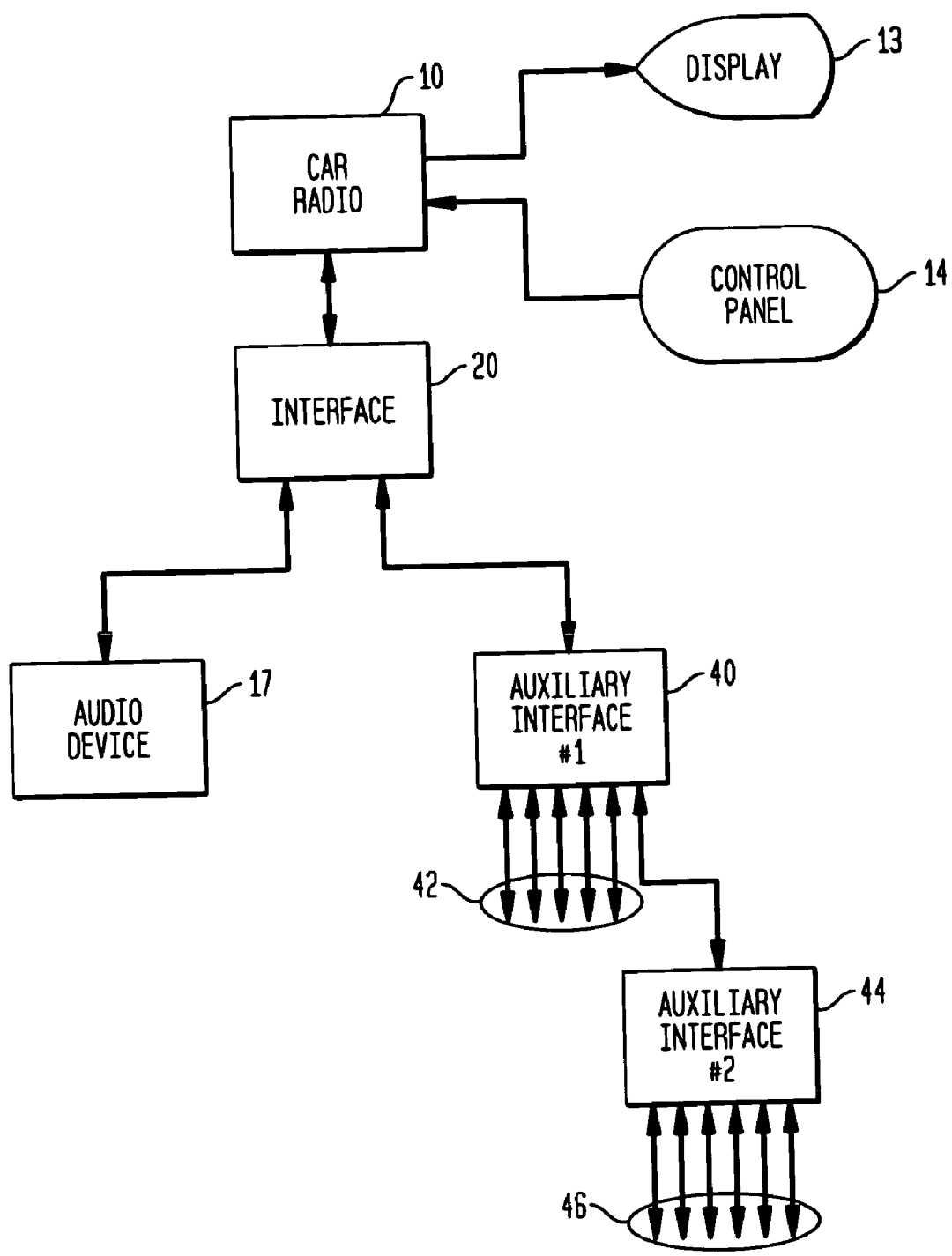
FIG. 2h is a block diagram showing an alternate embodiment of the present invention, wherein a plurality of auxiliary interfaces and an audio device are integrated with a car stereo.

FIG. 2h is a block diagram showing an alternate embodiment of the present invention, wherein a plurality of auxiliary interfaces 40 and 44 and an audio device 17 are integrated with an OEM or after-market car stereo 10. Importantly, the present invention can be expanded to allow a plurality of auxiliary inputs to be connected to the car stereo 10 in a tree-like fashion. Thus, as can be seen in FIG. 2h, a first auxiliary interface 40 is connected to the interface 20, and allows data and audio from the ports 42 to be exchanged with the car radio 10. Connected to one of the ports 42 is another auxiliary interface 44, which, in turn, provides a plurality of input ports 46. Any device connected to any of the ports 42 or 46 can be integrated with the car radio 10. Further, any device connected to the ports 42 or 46 can be inter-operable with the car radio 10, allowing commands to be entered from the car radio 10 (e.g., such as via the control panel 14) for commanding the device, and information from the device to be displayed by the car radio 10. Conceivably, by configuring the interfaces 40, 44, and successive interfaces in a tree configuration, any number of devices can be integrated using the present invention.

The various embodiments of the present invention described above and shown in FIGS. 1 through 2h are illustrative in nature and are not intended to limit the spirit or scope of the present invention. Indeed, any conceivable audio device or input source, in any desired combination, can be integrated by the present invention into existing car stereo systems. Further, it is conceivable that not only can data and audio signals be exchanged between the car stereo and any external device, but also video information that can be captured by the present invention, processed thereby, and transmitted to the car stereo for display thereby and interaction with a user thereat.

Various circuit configurations can be employed to carry out the present invention. Examples of such configurations are described below and shown in FIGS. 3a-3d.

Figure 3A:
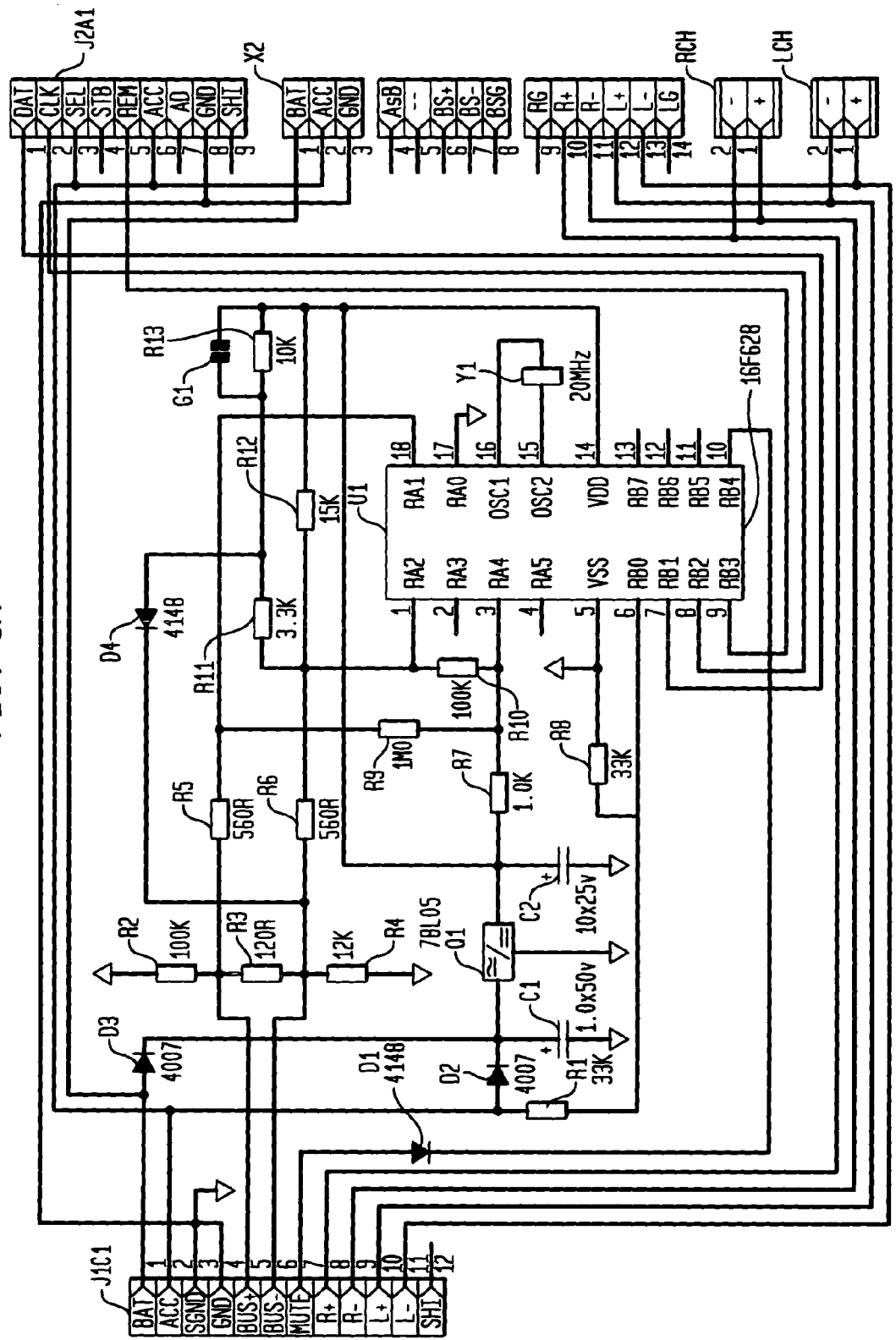
FIG. 3a is a circuit diagram showing a device according to the present invention for integrating a CD player or an auxiliary input source with a car radio.

FIG. 3a is an illustrative circuit diagram according to the present invention for integrating a CD player or an auxiliary input source with an existing car stereo system. A plurality of ports J1C1, J2A1, X2, RCH, and LCH are provided for allowing connection of the interface system of the present invention between an existing car radio, an after-market CD player or changer, or an auxiliary input source. Each of these ports could be embodied by any suitable electrical connector known in the art. Port J1C1 connects to the input port of an OEM car radio, such as that manufactured by TOYOTA, Inc. Conceivably, port J1C1 could be modified to allow connection to the input port of an after-market car radio. Ports J2A1, X2, RCH, and LCH connect to an after-market CD changer, such as that manufactured by PANASONIC, Inc., or to an auxiliary input source.

Microcontroller U1 is in electrical communication with each of the ports J1C1, J2A1, and X2, and provides functionality for integrating the CD player or auxiliary input source connected to the ports J2A1, X2, RCH, and LCH. For example, microcontroller U1 receives control commands, such as button or key sequences, initiated by a user at control panel of the car radio and received at the connector J1C1, processes and formats same, and dispatches the formatted commands to the CD player or auxiliary input source via connector J2A1. Additionally, the microcontroller U1 receives information provided by the CD player or auxiliary input source via connector J2A1, processes and formats same, and transmits the formatted data to the car stereo via connector J1C1 for display on the display of the car stereo. Audio signals provided at the ports J2A1, X2, RCH and LCH is selectively channeled to the car radio at port J1C1 under control of one or more user commands and processing logic, as will be discussed in greater detail, embedded within microcontroller U1.

In a preferred embodiment of the present invention, the microcontroller U1 comprises the 16F628 microcontroller manufactured by MICROCHIP, Inc. The 16F628 chip is a CMOS, flash-based, 8-bit microcontroller having an internal, 4 MHz internal oscillator, 128 bytes of EEPROM data memory, a capture/compare/PWM, a USART, 2 comparators, and a programmable voltage reference. Of course, any suitable microcontroller known in the art can be substituted for microcontroller U1 without departing from the spirit or scope of the present invention.

A plurality of discrete components, such as resistors R1 through R13, diodes D1 through D4, capacitors C1 and C2, and oscillator Y1, among other components, are provided for interfacing the microcontroller U1 with the hardware connected to the connectors J1C1, J2A1, X2, RCH, and LCH. These components, as will be readily appreciated to one of ordinary skill in the art, can be arranged as desired to accommodate a variety of microcontrollers, and the numbers and types of discrete components can be varied to accommodate other similar controllers. Thus, the circuit shown in FIG. 3a and described herein is illustrative in nature, and modifications thereof are considered to be within the spirit and scope of the present invention.

FIG. 3b is a diagram showing an illustrative circuit configuration according to the present invention, wherein one or more after-market CD changers/players and an auxiliary input source are integrated with an existing car stereo, and wherein the user can select between the CD changer/player and the auxiliary input using the controls of the car stereo. A plurality of connectors are provided, illustratively indicated as ports J4A, J4B, J3, J5L1, J5R1, J1, and J2. Ports J4A, J4B, and J3 allow the audio device interface system of the present invention to be connected to one or more existing car stereos, such as an OEM car stereo or an after-market car stereo. Each of these ports could be embodied by any suitable electrical connector known in the art. For example, ports J4A and J4B can be connected to an OEM car stereo manufactured by BMW, Inc. Port J3 can be connected to a car stereo manufactured by LANDROVER, Inc. Of course, any number of car stereos, by any manufacturer, could be provided. Ports J1 and J2 allow connection to an after-market CD changer or player, such as that manufactured by ALPINE, Inc., and an auxiliary input source. Optionally, ports J5L1 and J5R1 allow integration of a standard analog (line-level) source. Of course, a single standalone CD player or auxiliary input source could be connected to either of ports J1 or J2.

Microcontroller DD1 is in electrical communication with each of the ports J4A, J4B, J3, J5L1, J5R1, J1, and J2, and provides functionality for integrating the CD player and auxiliary input source connected to the ports J1 and J2 with the car stereo connected to the ports J4A and J4B or J3. For example, microcontroller DD1 receives control commands, such as button or key sequences, initiated by a user at control panel of the car radio and received at the connectors J4A and J4B or J3, processes and formats same, and dispatches the formatted commands to the CD player and auxiliary input source via connectors J1 or J2. Additionally, the microcontroller DD1 receives information provided by the CD player and auxiliary input source via connectors J1 or J2, processes and formats same, and transmits the formatted data to the car stereo via connectors J4A and J4B or J3 for display on the display of the car stereo. Further, the microcontroller DD1 controls multiplexer DA3 to allow selection between the CD player/changer and the auxiliary input. Audio signals provided at the ports J1, J2, J5L1 and J5R1 is selectively channeled to the car radio at ports J4A and J4B or J3 under control of one or more user commands and processing logic, as will be discussed in greater detail, embedded within microcontroller DD1.

In a preferred embodiment of the present invention, the microcontroller DD1 comprises the 16F872 microcontroller manufactured by MICROCHIP, Inc. The 16F872 chip is a CMOS, flash-based, 8-bit microcontroller having 64 bytes of EEPROM data memory, self-programming capability, an ICD, 5 channels of 10 bit Analog-to-Digital (A/D) converters, 2 timers, capture/compare/PWM functions, a USART, and a synchronous serial port configurable as either a 3-wire serial peripheral interface or a 2-wire inter-integrated circuit bus. Of course, any suitable microcontroller known in the art can be substituted for microcontroller DD1 without departing from the spirit or scope of the present invention. Additionally, in a preferred embodiment of the present invention, the multiplexer DA3 comprises the CD4053 triple, two-channel analog multiplexer/demultiplexer manufactured by FAIRCHILD SEMICONDUCTOR, Inc. Any other suitable multiplexer can be substituted for DA3 without departing from the spirit or scope of the present invention.

A plurality of discrete components, such as resistors R1 through R18, diodes D1 through D3, capacitors C1-C11, and G1-G3, transistors Q1-Q3, transformers T1 and T2, amplifiers LCH:A and LCH:B, oscillator XTAL1, among other components, are provided for interfacing the microcontroller DD1 and the multiplexer DA3 with the hardware connected to the connectors J4A, J4B, J3, J5L1, J5R1, J1, and J2. These components, as will be readily appreciated to one of ordinary skill in the art, can be arranged as desired to accommodate a variety of microcontrollers and multiplexers, and the numbers and types of discrete components can be varied to accommodate other similar controllers and multiplexers. Thus, the circuit shown in FIG. 3b and described herein is illustrative in nature, and modifications thereof are considered to be within the spirit and scope of the present invention.

FIG. 3c is a diagram showing an illustrative circuit configuration for integrating a plurality of auxiliary inputs using the controls of the car stereo. A plurality of connectors are provided, illustratively indicated as ports J1, RCH1, LCH1, RCH2, LCH2, RCH3, LCH3, RCH4, and LCH4. Port J1 allows the audio device integration system of the present invention to be connected to one or more existing car stereos. Each of these ports could be embodied by any suitable electrical connector known in the art. For example, port J1 could be connected to an OEM car stereo manufactured by HONDA, Inc., or any other manufacturer. Ports RCH1, LCH1, RCH2, LCH2, RCH3, LCH3, RCH4, and LCH4 allow connection with the left and right channels of four auxiliary input sources. Of course, any number of auxiliary input sources and ports/connectors could be provided.

Microcontroller U1 is in electrical communication with each of the ports J1, RCH1, LCH1, RCH2, LCH2, RCH3, LCH3, RCH4, and LCH4, and provides functionality for integrating one or more auxiliary input sources connected to the ports RCH1, LCH1, RCH2, LCH2, RCH3, LCH3, RCH4, and LCH4 with the car stereo connected to the port J1. Further, the microcontroller U1 controls multiplexers DA3 and DA4 to allow selection amongst any of the auxiliary inputs using the controls of the car stereo. Audio signals provided at the ports RCH1, LCH1, RCH2, LCH2, RCH3, LCH3, RCH4, and LCH4 are selectively channeled to the car radio at port J1 under control of one or more user commands and processing logic, as will be discussed in greater detail, embedded within microcontroller U1. In a preferred embodiment of the present invention, the microcontroller U1 comprises the 16F872 microcontroller discussed earlier. Additionally, in a preferred embodiment of the present invention, the multiplexers DA3 and DA4 comprises the CD4053 triple, two-channel analog multiplexer/demultiplexer, discussed earlier. Any other suitable microcontroller and multiplexers can be substituted for U1, DA3, and DA4 without departing from the spirit or scope of the present invention.

A plurality of discrete components, such as resistors R1 through R15, diodes D1 through D3, capacitors C1-C5, transistors Q1-Q2, amplifiers DA1:A and DA1:B, and oscillator Y1, among other components, are provided for interfacing the microcontroller U1 and the multiplexers DA3 and DA4 with the hardware connected to the ports J1, RCH1, LCH1, RCH2, LCH2, RCH3, LCH3, RCH4, and LCH4. These components, as will be readily appreciated to one of ordinary skill in the art, can be arranged as desired to accommodate a variety of microcontrollers and multiplexers, and the numbers and types of discrete components can be varied to accommodate other similar controllers and multiplexers. Thus, the circuit shown in FIG. 3c and described herein is illustrative in nature, and modifications thereof are considered to be within the spirit and scope of the present invention.

Figure 3D:
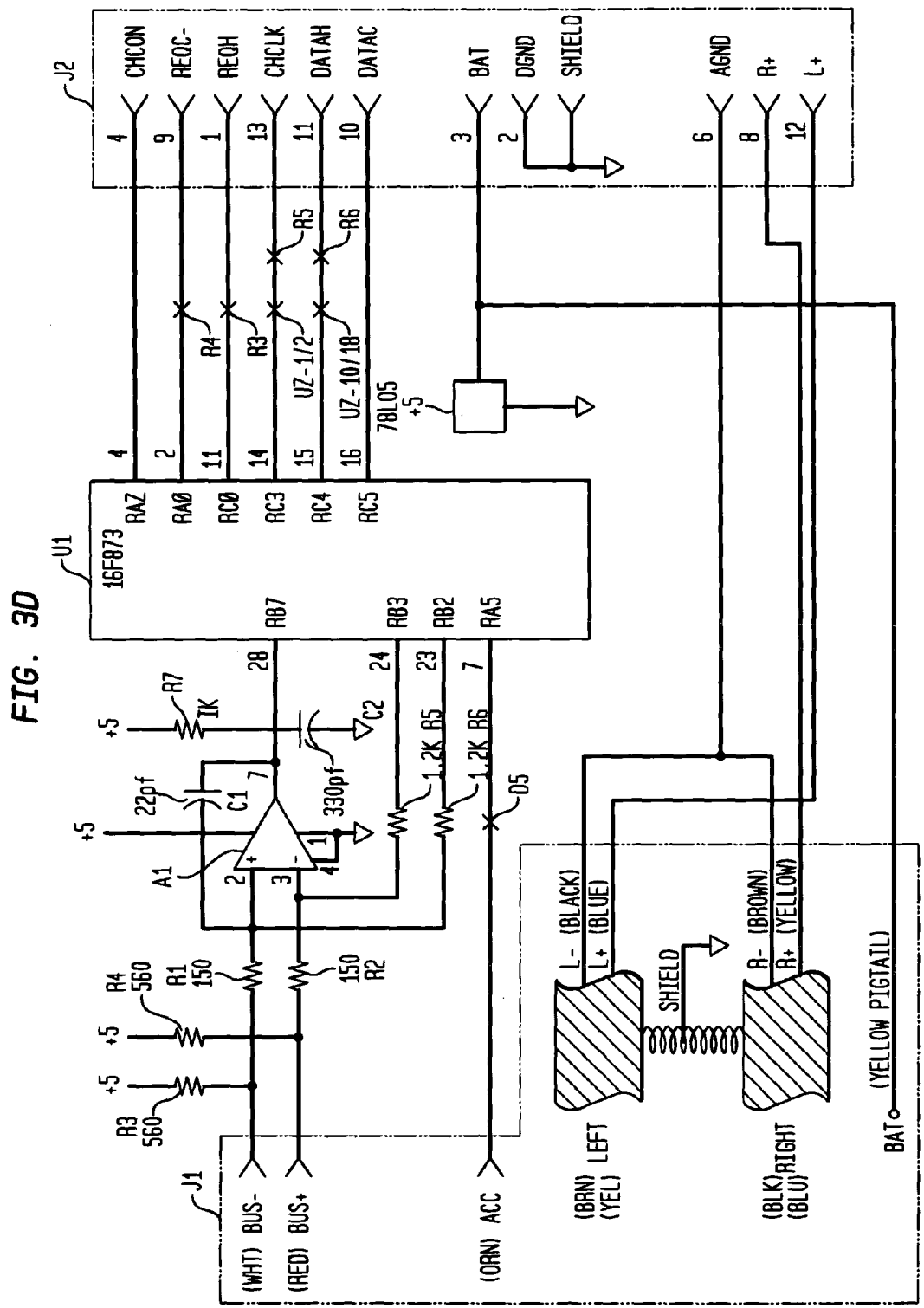
FIG. 3d is a circuit diagram showing a device according to the present invention for integrating a satellite or DAB receiver with a car radio.

FIG. 3d is an illustrative circuit diagram according to the present invention for integrating a satellite receiver with an existing OEM or after-market car stereo system. Ports J1 and J2 are provided for allowing connection of the integration system of the present invention between an existing car radio and a satellite receiver. These ports could be embodied by any suitable electrical connector known in the art. Port J2 connects to the input port of an existing car radio, such as that manufactured by KENWOOD, Inc. Port 1 connects to an after-market satellite receiver, such as that manufactured by PIONEER, Inc.

Microcontroller U1 is in electrical communication with each of the ports J1 and J2, and provides functionality for integrating the satellite receiver connected to the port J1 with the car stereo connected to the port J2. For example, microcontroller U1 receives control commands, such as button or key sequences, initiated by a user at control panel of the car radio and received at the connector J2, processes and formats same, and dispatches the formatted commands to the satellite receiver via connector J2. Additionally, the microcontroller U1 receives information provided by the satellite receiver via connector J1, processes and formats same, and transmits the formatted data to the car stereo via connector J2 for display on the display of the car stereo. Audio signals provided at the port J1 is selectively channeled to the car radio at port J2 under control of one or more user commands and processing logic, as will be discussed in greater detail, embedded within microcontroller U1.

In a preferred embodiment of the present invention, the microcontroller U1 comprises the 16F873 microcontroller manufactured by MICROCHIP, Inc. The 16F873 chip is a CMOS, flash-based, 8-bit microcontroller having 128 bytes of EEPROM data memory, self-programming capability, an ICD, 5 channels of 10 bit Analog-to-Digital (A/D) converters, 2 timers, 2 capture/compare/PWM functions, a synchronous serial port that can be configured as a either a 3-wire serial peripheral interface or a 2-wire inter-integrated circuit bus, and a USART. Of course, any suitable microcontroller known in the art can be substituted for microcontroller U1 without departing from the spirit or scope of the present invention.

A plurality of discrete components, such as resistors R1 through R7, capacitors C1 and C2, and amplifier A1, among other components, are provided for interfacing the microcontroller U1 with the hardware connected to the connectors J1 and J2. These components, as will be readily appreciated to one of ordinary skill in the art, can be arranged as desired to accommodate a variety of microcontrollers, and the numbers and types of discrete components can be varied to accommodate other similar controllers. Thus, the circuit shown in FIG. 3d and described herein is illustrative in nature, and modifications thereof are considered to be within the spirit and scope of the present invention.

FIGS. 4a through 6 are flowcharts showing processing logic according to the present invention. Such logic can be embodied as software and/or instructions stored in a read-only memory circuit (e.g., and EEPROM circuit), or other similar device. In a preferred embodiment of the present invention, the processing logic described herein is stored in one or more microcontrollers, such as the microcontrollers discussed earlier with reference to FIGS. 3a-3d. Of course, any other suitable means for storing the processing logic of the present invention can be employed.

FIG. 4a is a flowchart showing processing logic, indicated generally at 100, for integrating a CD player or changer with an existing OEM or after-market car stereo system. Beginning in step 100, a determination is made as to whether the existing car stereo is powered on. If a negative determination is made, step 104 is invoked, wherein the present invention enters a standby mode and waits for the car stereo to be powered on. If a positive determination is made, step 106 is invoked, wherein a second determination is made as to whether the car stereo is in CD player mode. If a negative determination is made, step 106 is re-invoked.

If a positive determination is made in step 106, a CD handling process, indicated as block 108, is invoked, allowing the CD player/changer to exchange data and audio signals with any existing car stereo system. Beginning in step 110, a signal is generated by the present invention indicating that a CD player/changer is present, and the signal is continuously transmitted to the car stereo. Importantly, this signal prevents the car stereo from shutting off, entering a sleep mode, or otherwise being unresponsive to signals and/or data from an external source. If the car radio is an OEM car radio, the CD player presence signal need not be generated. Concurrently with step 110, or within a short period of time before or after the execution of step 110, steps 112 and 114 are invoked. In step 112, the audio channels of the CD player/changer are connected (channeled) to the car stereo system, allowing audio from the CD player/changer to be played through the car stereo. In step 114, data is retrieved by the present invention from the CD player/changer, including track and time information, formatted, and transmitted to the car stereo for display by the car stereo. Thus, information produced by the external CD player/changer can be quickly and conveniently viewed by a driver by merely viewing the display of the car stereo. After steps 110, 112, and 114 have been executed, control passes to step 116.

In steps 116, the present invention monitors the control panel buttons of the car stereo for CD operational commands. Examples of such commands include track forward, track reverse, play, stop, fast forward, rewind, track program, random track play, and other similar commands. In step 118, if a command is not detected, step 116 is re-invoked. Otherwise, if a command is received, step 118 invokes step 120, wherein the received command is converted into a format recognizable by the CD player/changer connected to the present invention. For example, in this step, a command issued from a GM car radio is converted into a format recognizable by a CD player/changer manufactured by ALPINE, Inc. Any conceivable command from any type of car radio can be formatted for use by a CD player/changer of any type or manufacture. Once the command has been formatted, step 122 is invoked, wherein the formatted command is transmitted to the CD player/changer and executed. Step 110 is then re-invoked, so that additional processing can occur.

Figure 4B:
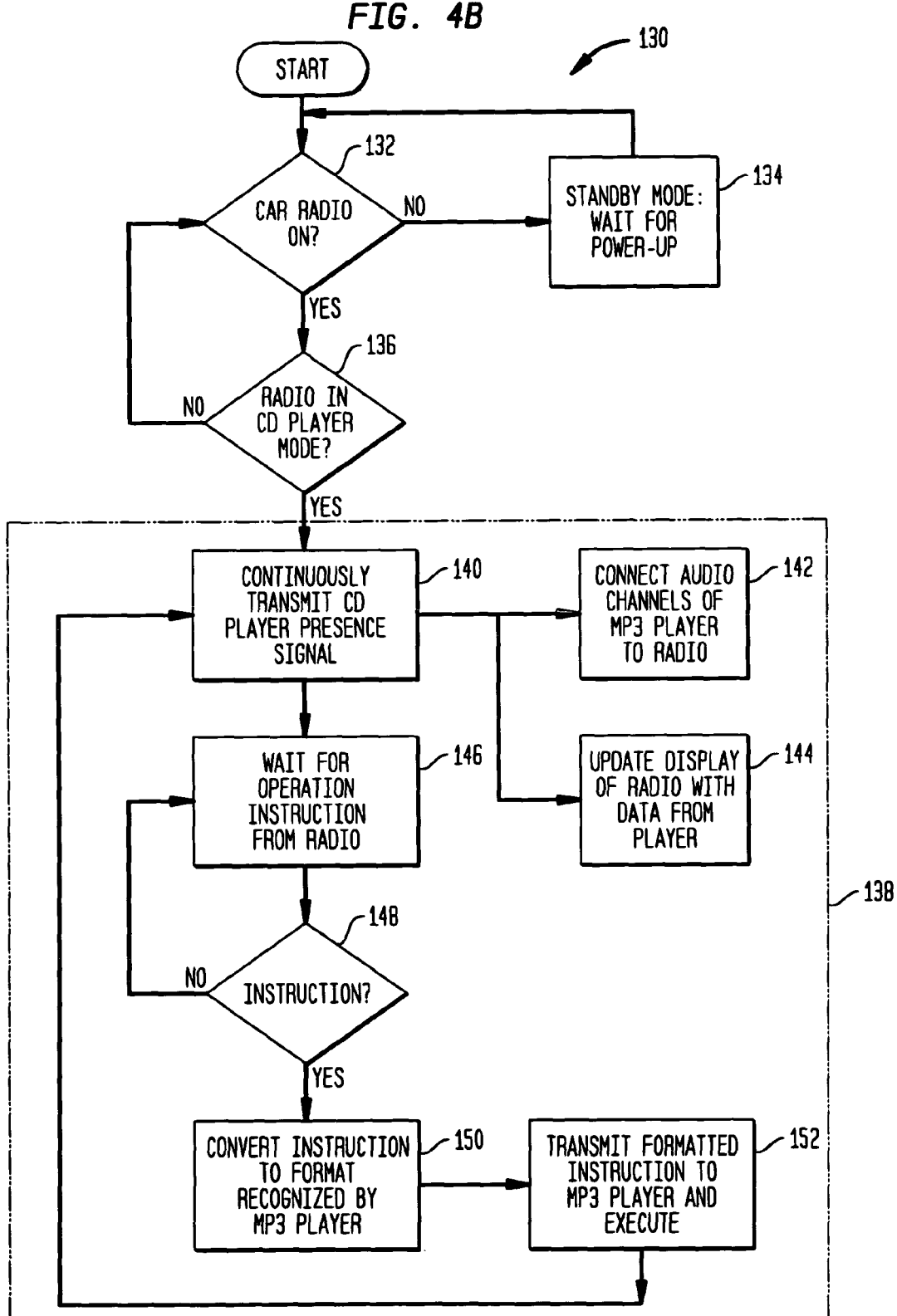
FIG. 4b is a flowchart showing processing logic according to the present invention for integrating a MP3 player with a car radio.

FIG. 4b is a flowchart showing processing logic, indicated generally at 130, for integrating an MP3 player with an existing car stereo system. Beginning in step 132, a determination is made as to whether the existing car stereo is powered on. If a negative determination is made, step 134 is invoked, wherein the present invention enters a standby mode and waits for the car stereo to be powered on. If a positive determination is made, step 136 is invoked, wherein a second determination is made as to whether the car stereo is in CD player mode. If a negative determination is made, step 136 is re-invoked.

If a positive determination is made in step 136, an MP3 handling process, indicated as block 138, is invoked, allowing the MP3 player to exchange data and audio signals with any existing car stereo system. Beginning in step 140, the CD player presence signal, described earlier, is generated by the present invention and continuously transmitted to the car stereo. If the car radio is an OEM car radio, the CD player presence signal need not be generated. In step 142, the audio channels of the MP3 player are connected (channeled) to the car stereo system, allowing audio from the MP3 player to be played through the car stereo. In step 144, data is retrieved by the present invention from the MP3 player, including track, time, title, and song information, formatted, and transmitted to the car stereo for display by the car stereo. Thus, information produced by the MP3 player can be quickly and conveniently viewed by a driver by merely viewing the display of the car stereo. After steps 140, 142, and 144 have been executed, control passes to step 146.

In steps 146, the present invention monitors the control panel buttons of the car stereo for MP3 operational commands. Examples of such commands include track forward, track reverse, play, stop, fast forward, rewind, track program, random track play, and other similar commands. In step 148, if a command is not detected, step 146 is re-invoked. Otherwise, if a command is received, step 148 invokes step 150, wherein the received command is converted into a format recognizable by the MP3 player connected to the present invention. For example, in this step, a command issued from a HONDA car radio is converted into a format recognizable by an MP3 player manufactured by PANASONIC, Inc. Any conceivable command from any type of car radio can be formatted for use by an MP3 player of any type or manufacture. Once the command has been formatted, step 152 is invoked, wherein the formatted command is transmitted to the MP3 player and executed. Step 140 is then re-invoked, so that additional processing can occur.

FIG. 4c is a flowchart showing processing logic, indicated generally at 160, for integrating a satellite receiver or a DAB receiver with an existing car stereo system. Beginning in step 162, a determination is made as to whether the existing car stereo is powered on. If a negative determination is made, step 164 is invoked, wherein the present invention enters a standby mode and waits for the car stereo to be powered on. If a positive determination is made, step 166 is invoked, wherein a second determination is made as to whether the car stereo is in CD player mode. If a negative determination is made, step 166 is re-invoked.

If a positive determination is made in step 166, a satellite/DAB receiver handling process, indicated as block 168, is invoked, allowing the satellite/DAB receiver to exchange data and audio signals with any existing car stereo system. Beginning in step 170, the CD player presence signal, described earlier, is generated by the present invention and continuously transmitted to the car stereo. If the car radio is an OEM car radio, the CD player presence signal need not be generated. In step 172, the audio channels of the satellite/DAB receiver are connected (channeled) to the car stereo system, allowing audio from the satellite receiver or DAB receiver to be played through the car stereo. In step 174, data is retrieved by the present invention from the satellite/DAB receiver, including channel number, channel name, artist name, song time, and song title, formatted, and transmitted to the car stereo for display by the car stereo. The information could be presented in one or more menus, or via a graphical interface viewable and manipulable by the user at the car stereo. Thus, information produced by the receiver can be quickly and conveniently viewed by a driver by merely viewing the display of the car stereo. After steps 170, 172, and 174 have been executed, control passes to step 176.

In steps 176, the present invention monitors the control panel buttons of the car stereo for satellite/DAB receiver operational commands. Examples of such commands include station up, station down, station memory program, and other similar commands. In step 178, if a command is not detected, step 176 is re-invoked. Otherwise, if a command is received, step 178 invokes step 180, wherein the received command is converted into a format recognizable by the satellite/DAB receiver connected to the present invention. For example, in this step, a command issued from a FORD car radio is converted into a format recognizable by a satellite receiver manufactured by PIONEER, Inc. Any conceivable command from any type of car radio can be formatted for use by a satellite/DAB receiver of any type or manufacture. Once the command has been formatted, step 182 is invoked, wherein the formatted command is transmitted to the satellite/DAB receiver and executed. Step 170 is then re-invoked, so that additional processing can occur.

Figure 4D:
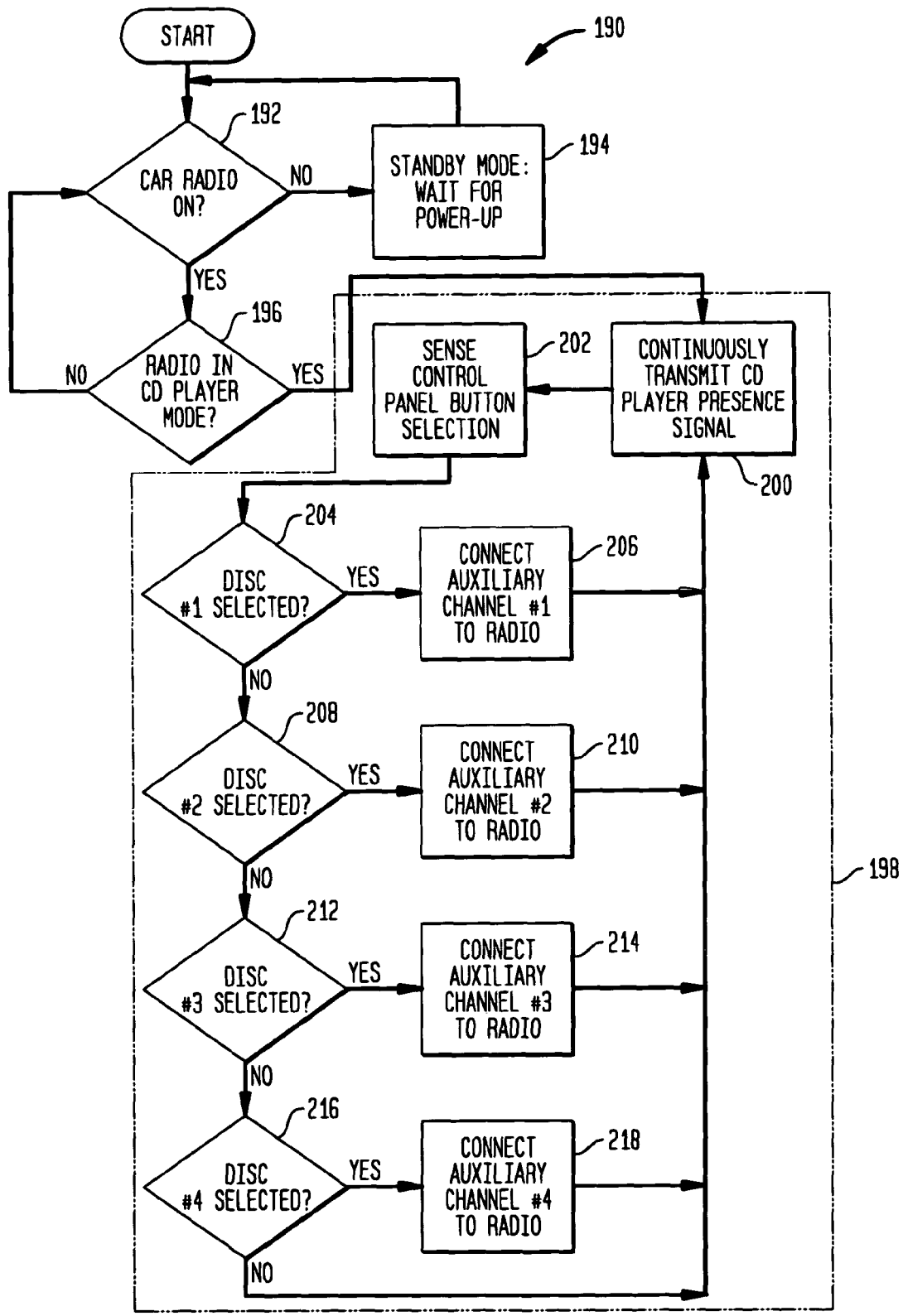
FIG. 4d is a flowchart showing processing logic according to the present invention for integrating a plurality of auxiliary input sources with a car radio.

FIG. 4d is a flowchart showing processing logic, indicated generally at 190, for integrating a plurality of auxiliary input sources with a car radio. Beginning in step 192, a determination is made as to whether the existing car stereo is powered on. If a negative determination is made, step 194 is invoked, wherein the present invention enters a standby mode and waits for the car stereo to be powered on. If a positive determination is made, step 196 is invoked, wherein a second determination is made as to whether the car stereo is in CD player mode. If a negative determination is made, step 196 is re-invoked.

If a positive determination is made in step 196, an auxiliary input handling process, indicated as block 198, is invoked, allowing one or more auxiliary inputs to be connected (channeled) to the car stereo. Further, if a plurality of auxiliary inputs exist, the logic of block 198 allows a user to select a desired input from the plurality of inputs. Beginning in step 200, the CD player presence signal, described earlier, is generated by the present invention and continuously transmitted to the car stereo. If the car radio is an OEM car radio, the CD player presence signal need not be generated. Then, in step 202, the control panel buttons of the car stereo are monitored.

In a preferred embodiment of the present invention, each of the one or more auxiliary input sources are selectable by selecting a CD disc number on the control panel of the car radio. Thus, in step 204, a determination is made as to whether the first disc number has been selected. If a positive determination is made, step 206 is invoked, wherein the first auxiliary input source is connected (channeled) to the car stereo. If a negative determination is made, step 208 is invoked, wherein a second determination is made as to whether the second disc number has been selected. If a positive determination is made, step 210 is invoked, wherein the second auxiliary input source is connected (channeled) to the car stereo. If a negative determination is made, step 212 is invoked, wherein a third determination is made as to whether the third disc number has been selected. If a positive determination is made, step 214 is invoked, wherein the third auxiliary input source is connected (channeled) to the car stereo. If a negative determination is made, step 216 is invoked, wherein a fourth determination is made as to whether the fourth disc number has been selected. If a positive determination is made, step 218 is invoked, wherein the fourth auxiliary input source is connected (channeled) to the car stereo. If a negative determination is made, step 200 is re-invoked, and the process disclosed for block 198 repeated. Further, if any of steps 206, 210, 214, or 218 are executed, then step 200 is re-invoked and block 198 repeated.

The process disclosed in block 198 allows a user to select from one of four auxiliary input sources using the control buttons of the car stereo. Of course, the number of auxiliary input sources connectable with and selectable by the present invention can be expanded to any desired number. Thus, for example, 6 auxiliary input sources could be provided and switched using corresponding selection key(s) or keystroke(s) on the control panel of the radio. Moreover, any desired keystroke, selection sequence, or button(s) on the control panel of the radio, or elsewhere, can be utilized to select from the auxiliary input sources without departing from the spirit or scope of the present invention.

FIG. 4e is a flowchart showing processing logic, indicated generally at 220, for integrating a CD player and one or more auxiliary input sources with a car radio. Beginning in step 222, a determination is made as to whether the existing car stereo is powered on. If a negative determination is made, step 224 is invoked, wherein the present invention enters a standby mode and waits for the car stereo to be powered on. If a positive determination is made, step 226 is invoked, wherein a second determination is made as to whether the car stereo is in CD player mode. If a negative determination is made, step 226 is re-invoked.

If a positive determination is made in step 226, then step 228 is invoked, wherein the CD player presence signal, described earlier, is generated by the present invention and continuously transmitted to the car stereo. Then, in step 230, a determination is made as to whether a CD player is present (i.e., whether an external CD player or changer is connected to the audio device integration system of the present invention). If a positive determination is made, steps 231 and 232 are invoked. In step 231, the logic of block 108 of FIG. 4a (the CD handling process), described earlier, is invoked, so that the CD player/changer can be integrated with the car stereo and utilized by a user. In step 232, a sensing mode is initiated, wherein the present invention monitors for a selection sequence (as will be discussed in greater detail) initiated by the user at the control panel of the car stereo for switching from the external CD player/changer to one or more auxiliary input sources. Step 234 is then invoked, wherein a determination is made as to whether such a sequence has been initiated. If a negative determination is made, step 234 re-invokes step 228, so that further processing can occur. Otherwise, if a positive determination is made (i.e., the user desires to switch from the external CD player/changer to one of the auxiliary input sources), step 236 is invoked, wherein the audio channels of the CD player/changer are disconnected from the car stereo. Then, step 238 is invoked, wherein the logic of block 198 of FIG. 4d (the auxiliary input handling process), discussed earlier, is executed, allowing the user to select from one of the auxiliary input sources. In the event that a negative determination is made in step 230 (no external CD player/changer is connected to the present invention), then step 238 is invoked, and the system goes into auxiliary mode. The user can then select from one or more auxiliary input sources using the controls of the radio.

FIG. 4f is a flowchart showing processing logic, indicated generally at 240, for integrating a satellite receiver or DAB receiver and one or more auxiliary input sources with a car radio. Beginning in step 242, a determination is made as to whether the existing car stereo is powered on. If a negative determination is made, step 244 is invoked, wherein the present invention enters a standby mode and waits for the car stereo to be powered on. If a positive determination is made, step 246 is invoked, wherein a second determination is made as to whether the car stereo is in CD player mode. If a negative determination is made, step 246 is re-invoked.

If a positive determination is made in step 246, then step 248 is invoked, wherein the CD player presence signal, described earlier, is generated by the present invention and continuously transmitted to the car stereo. Then, in step 250, a determination is made as to whether a satellite receiver or DAB receiver is present (i.e., whether an external satellite receiver or DAB receiver is connected to the audio device integration system of the present invention). If a positive determination is made, steps 231 and 232 are invoked. In step 251, the logic of block 168 of FIG. 4c (the satellite/DAB receiver handling process), described earlier, is invoked, so that the satellite receiver can be integrated with the car stereo and utilized by a user. In step 252, a sensing mode is initiated, wherein the present invention monitors for a selection sequence (as will be discussed in greater detail) initiated by the user at the control panel of the car stereo for switching from the external satellite receiver to one or more auxiliary input sources. Step 254 is then invoked, wherein a determination is made as to whether such a sequence has been initiated. If a negative determination is made, step 254 re-invokes step 258, so that further processing can occur. Otherwise, if a positive determination is made (i.e., the user desires to switch from the external satellite/DAB receiver to one of the auxiliary input sources), step 256 is invoked, wherein the audio channels of the satellite receiver are disconnected from the car stereo. Then, step 258 is invoked, wherein the logic of block 198 of FIG. 4d (the auxiliary input handling process), discussed earlier, is executed, allowing the user to select from one of the auxiliary input sources. In the event that a negative determination is made in step 250 (no external satellite/DAB receiver is connected to the present invention), then step 258 is invoked, and the system goes into auxiliary mode. The user can then select from one or more auxiliary input sources using the controls of the radio.

FIG. 4g is a flowchart showing processing logic according to the present invention for integrating an MP3 player and one or more auxiliary input sources with a car stereo. Beginning in step 262, a determination is made as to whether the existing car stereo is powered on. If a negative determination is made, step 264 is invoked, wherein the present invention enters a standby mode and waits for the car stereo to be powered on. If a positive determination is made, step 266 is invoked, wherein a second determination is made as to whether the car stereo is in CD player mode. If a negative determination is made, step 266 is re-invoked.

If a positive determination is made in step 266, then step 268 is invoked, wherein the CD player presence signal, described earlier, is generated by the present invention and continuously transmitted to the car stereo. Then, in step 270, a determination is made as to whether an MP3 player is present (i.e., whether an external MP3 player is connected to the audio device integration system of the present invention). If a positive determination is made, steps 271 and 272 are invoked. In step 271, the logic of block 138 of FIG. 4b (the MP3 handling process), described earlier, is invoked, so that the CD player/changer can be integrated with the car stereo and utilized by a user. In step 272, a sensing mode is initiated, wherein the present invention monitors for a selection sequence (as will be discussed in greater detail) initiated by the user at the control panel of the car stereo for switching from the external CD player/changer to one or more auxiliary input sources. Step 274 is then invoked, wherein a determination is made as to whether such a sequence has been initiated. If a negative determination is made, step 274 re-invokes step 278, so that further processing can occur. Otherwise, if a positive determination is made (i.e., the user desires to switch from the external MP3 player to one of the auxiliary input sources), step 276 is invoked, wherein the audio channels of the MP3 player are disconnected from the car stereo. Then, step 278 is invoked, wherein the logic of block 198 of FIG. 4*d* (the auxiliary input handling process), discussed earlier, is executed, allowing the user to select from one of the auxiliary input sources. In the event that a negative determination is made in step 270 (no external MP3 player is connected to the present invention), then step 278 is invoked, and the system goes into auxiliary mode. The user can then select from one or more auxiliary input sources using the controls of the radio.

As mentioned previously, to enable integration, the present invention contains logic for converting command signals issued from an after-market or OEM car stereo into a format compatible with one or more external audio devices connected to the present invention. Such logic can be applied to convert any car stereo signal for use with any external device. For purposes of illustration, a sample code portion is shown in Table 1, below, for converting control signals from a BMW car stereo into a format understandable by a CD changer:

TABLE 1

```
; ==================================================
;   Radio requests changer to STOP (exit PLAY mode)
;   Decoding 6805183801004C message
; ==================================================
Encode_RD_stop_msg:
      movlw 0x68
      xorwf BMW_Recv_buff,W
      skpz
      return
      movlw 0x05
      xorwf BMW_Recv_buff+1,W
      skpz
      return
      movlw 0x18
      xorwf BMW_Recv_buff+2,W
      skpz
      return
      movlw 0x38
      xorwf BMW_Recv_buff+3,W
      skpz
      return
      movlw 0x01
      xorwf BMW_Recv_buff+4,W
      skpz
      return
      tstf BMW_Recv_buff+5
      skpz
      return
      movlw 0x4C
      xorwf BMW_Recv_buff+6,W
      skpz
      return
      bsf BMW_Recv_STOP_msg
      return
```

The code portion shown in Table 1 receives a STOP command issued by a BMW stereo, in a format proprietary to BMW stereos. Preferably, the received command is stored in a first buffer, such as BMW_Recv_buff. The procedure "Encode_RD_stop_msg" repetitively applies an XOR function to the STOP command, resulting in a new command that is in a format compatible with the after-market CD player. The command is then stored in an output buffer for dispatching to the CD player.

Additionally, the present invention contains logic for retrieving information from an after-market audio device, and converting same into a format compatible with the car stereo for display thereby. Such logic can be applied to convert any data from the external device for display on the car stereo. For purposes of illustration, a sample code portion is shown in Table 2, below, for converting data from a CD changer into a format understandable by a BMW car stereo:

TABLE 2

```
; ==========================================
;   Changer replies with STOP confirmation
;   Encoding 180A68390002003F0001027D message
; ==========================================
Load_CD_stop_msg:
      movlw 0x18
      movwf BMW_Send_buff
      movlw 0x0A
      movwf BMW_Send_buff+1
      movlw 0x68
      movwf BMW_Send_buff+2
      movlw 0x39
      movwf BMW_Send_buff+3
      movlw 0x00              ;current status_XX=00, power off
      movwf BMW_Send_buff+4
      movlw 0x02              ;current status_YY=02, power off
      movwf BMW_Send_buff+5
      clrf BMW_Send_buff+6    ;separate field, always =0
      movfw BMW_MM_stat       ;current status_MM ,
                               magazine config
      movwf BMW_Send_buff+7
      clrf BMW_Send_buff+8    ;separate field, always =0
      movfw BMW_DD_stat       ;current status_DD , current disc
      movwf BMW_Send_buff+9
      movfw BMW_TT_stat       ;current status_TT , current track
      movwf BMW_Send_buff+10
      xorwf BMW_Send_buff+9,W ;calculate check sum
      xorwf BMW_Send_buff+8,W
      xorwf BMW_Send_buff+7,W
      xorwf BMW_Send_buff+6,W
      xorwf BMW_Send_buff+5,W
      xorwf BMW_Send_buff+4,W
      xorwf BMW_Send_buff+3,W
      xorwf BMW_Send_buff+2,W
      xorwf BMW_Send_buff+1,W
      xorwf BMW_Send_buff,W
      movwf BMW_Send_buff +11 ;store check sum
      movlw D'12'             ;12 bytes total
      movwf BMW_Send_cnt
      bsf BMW_Send_on         ;ready to send
      return
```

The code portion shown in Table 2 receives a STOP confirmation message from the CD player, in a format proprietary to the CD player. Preferably, the received command is stored in a first buffer, such as BMW_Send_buff. The procedure "Load_CD_stop_msg" retrieves status information, magazine information, current disc, and current track information from the CD changer, and constructs a response containing this information. Then, a checksum is calculated and stored in another buffer. The response and checksum are in a format compatible with the BMW stereo, and are ready for dispatching to the car stereo.

While the above code portions are shown using assembler language, it is to be expressly understood that any low or high level language known in the art, such as C or C++, could be utilized without departing from the spirit or scope of the invention. It will be appreciated that various other code portions can be developed for converting signals from any after-market or OEM car stereo for use by an after-market external audio device, and vice versa.

Figure 5:
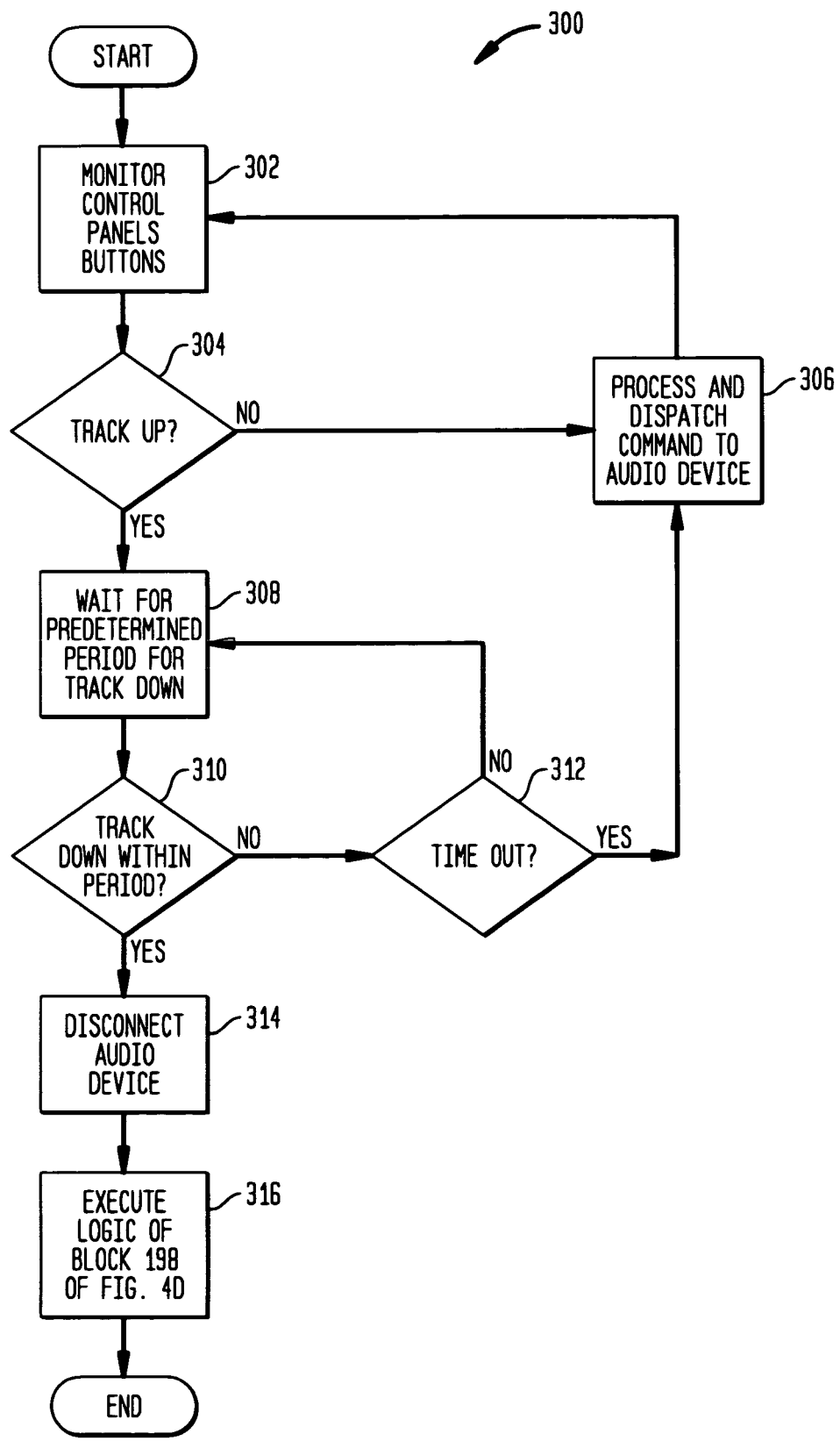
FIG. 5 is a flowchart showing processing logic according to the present invention for allowing a user to switch between an after-market audio device and one or more auxiliary input sources.

FIG. 5 is a flowchart showing processing logic, indicated generally at 300 for allowing a user to switch between an after-market audio device, and one or more auxiliary input sources. As was discussed earlier, the present invention allows a user to switch from one or more connected audio devices, such as an external CD player/changer, MP3 player, satellite receiver, DAB receiver, or the like, and activate one or more auxiliary input sources. A selection sequence, initiated by the user at the control panel of the car stereo, allows such switching. Beginning in step 302, the buttons of the control panel are monitored. In step 304, a determination is made as to whether a "Track Up" button or sequence has been initiated by the user. The "Track Up" button or sequence can for a CD player, MP3 player, or any other device. If a negative determination is made, step 306 is invoked, wherein the sensed button or sequence is processed in accordance with the present invention and dispatched to the external audio device for execution. Then, step 302 is re-invoked, so that additional buttons or sequences can be monitored.

In the event that a positive determination is made in step 304, step 308 is invoked, wherein the present invention waits for a predetermined period of time while monitoring the control panel buttons for additional buttons or sequences. In a preferred embodiment of the present invention, the predetermined period of time is 750 milliseconds, but of course, other time durations are considered within the spirit and scope of the present invention. In step 310, a determination is made as to whether the user has initiated a "Track Down" button or sequence at the control panel of the car stereo within the predetermined time period. The track down button or sequence can be for a CD player, MP3 player, or any other device. If a negative determination is made, step 312 is invoked. In step 312, a determination is made as to whether a timeout has occurred (e.g., whether the predetermined period of time has expired). If a negative determination is made, step 308 is re-invoked. Otherwise, is a positive determination is made, step 312 invokes step 306, so that any buttons or key sequences initiated by the user that are not a "Track Down" command are processed in accordance with the present invention and dispatched to the audio device for execution.

In the event that a positive determination is made in step 310 (a "Track Down" button or sequence has been initiated within the predetermined time period), then step 314 is invoked. In step 314, the audio channels of the audio device are disconnected, and then step 316 is invoked. In step 316, the logic of block 198 of FIG. 4d (the auxiliary input handling process), discussed earlier, is invoked, so that the user can select from one of the auxiliary input sources in accordance with the present invention. Thus, at this point in time, the system has switched, under user control, from the audio device to a desired auxiliary input. Although the foregoing description of the process 300 has been described with reference to "Track Up" and "Track Down" buttons or commands initiated by the user, it is to be expressly understood that any desired key sequence, keystroke, button depress, or any other action, can be sensed in accordance with the present invention and utilized for switching modes.

When operating in auxiliary mode, the present invention provides an indication on the display of the car stereo corresponding to such mode. For example, the CD number could be displayed as "1", and the track number displayed as "99," thus indicating to the user that the system is operating in auxiliary mode and that audio and data is being supplied from an auxiliary input source. Of course, any other indication could be generated and displayed on the display of the car stereo, such as a graphical display (e.g., an icon) or textual prompt (e.g., "Auxiliary 1" or a title corresponding to the device connected to the auxiliary port).

Figure 6:
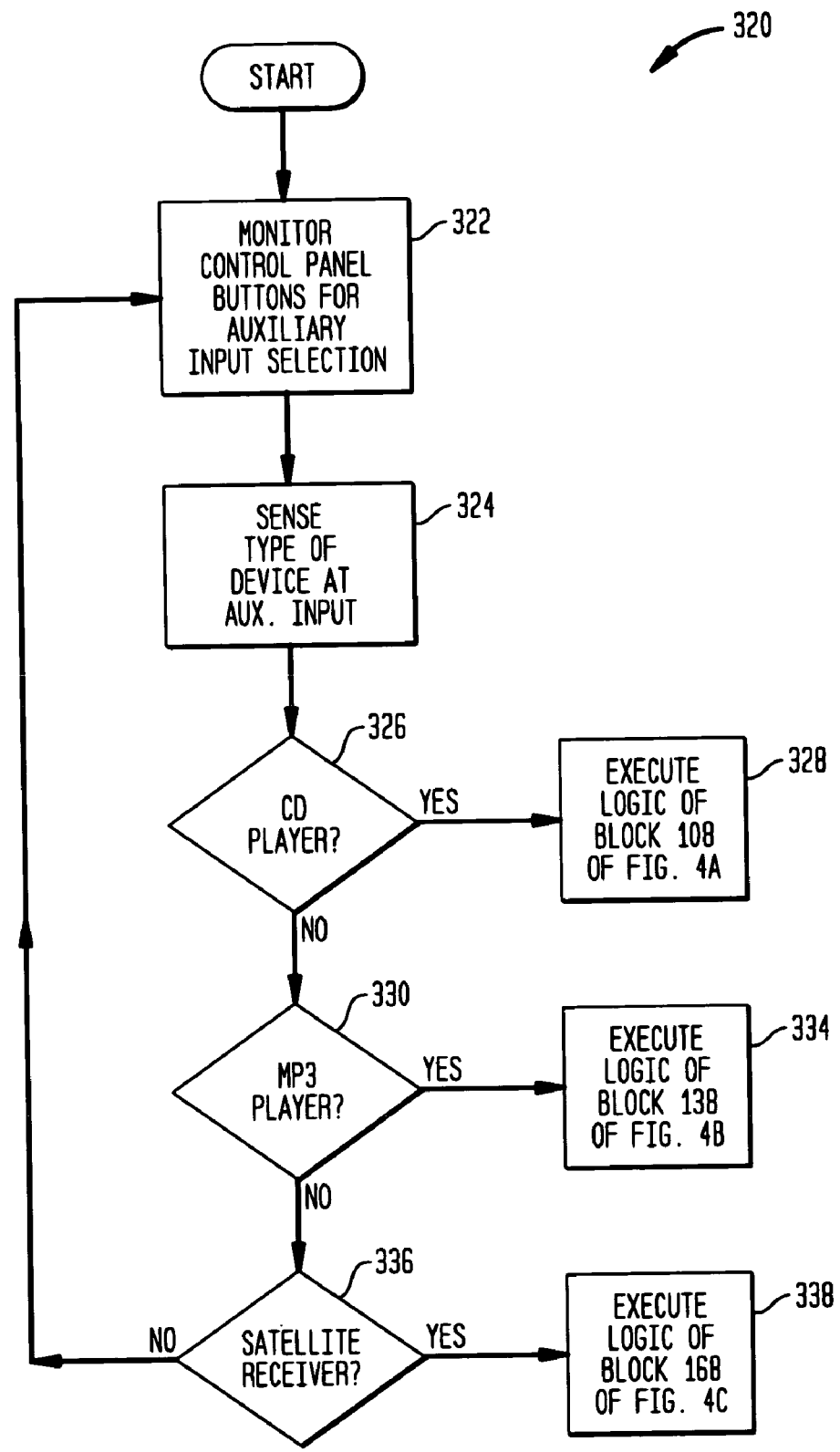
FIG. 6 is a flowchart showing processing logic according to the present invention for determining and handling various device types connected to the auxiliary input ports of the invention.

FIG. 6 is a flowchart showing processing logic, indicated generally at 320, for determining and handling various device types connected to the auxiliary input ports of the invention. The present invention can sense device types connected to the auxiliary input ports, and can integrate same with the car stereo using the procedures discussed earlier. Beginning in step 322, the control panel buttons of the car stereo are monitored for a button or sequence initiated by the user corresponding to an auxiliary input selection (such as the disc number method discussed earlier with reference to FIG. 4d). In response to an auxiliary input selection, step 324 is invoked, wherein the type of device connected to the selected auxiliary input is sensed by the present invention. Then, step 326 is invoked.

In step 326, a determination is made as to whether the device connected to the auxiliary input is a CD player/changer. If a positive determination is made, step 328 is invoked, wherein the logic of block 108 of FIG. 4a (the CD handling process), discussed earlier, is executed, and the CD player is integrated with the car stereo. If a negative determination is made in step 326, then step 330 is invoked. In step 330, a determination is made as to whether the device connected to the auxiliary input is an MP3 player. If a positive determination is made, step 334 is invoked, wherein the logic of block 138 if FIG. 4b (the MP3 handling process), discussed earlier, is executed, and the MP3 player is integrated with the car stereo. If a negative determination is made in step 330, then step 336 is invoked. In step 336, a determination is made as to whether the device connected to the auxiliary input is a satellite receiver or a DAB receiver. If a positive determination is made, step 338 is invoked, wherein the logic of block 168 of FIG. 4c (the satellite/DAB receiver handling process), discussed earlier, is executed, and the satellite receiver is integrated with the car stereo. If a negative determination is made in step 336, step 322 is re-invoked, so that additional auxiliary input selections can be monitored and processed accordingly. Of course, process 320 can be expanded to allow other types of devices connected to the auxiliary inputs of the present invention to be integrated with the car stereo.

The present invention can be expanded for allowing video information generated by an external device to be integrated with the display of an existing OEM or after-market car stereo. In such a mode, the invention accepts RGB input signals from the external device, and converts same to composite signals. The composite signals are then forwarded to the car stereo for display thereby, such as on an LCD panel of the stereo. Further, information from the external device can be formatted and presented to the user in one or more graphical user interfaces or menus capable of being viewed and manipulated on the car stereo.

Figure 7A:
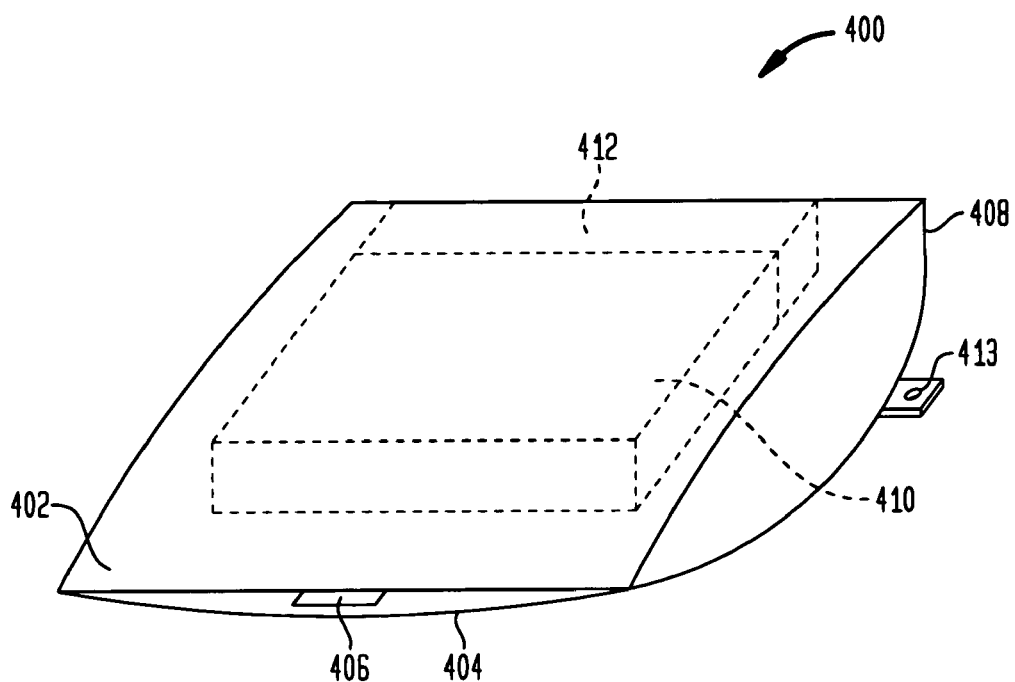
FIG. 7a is a perspective view of a docking station according to the present invention for retaining an audio device within a car.

FIG. 7a is a perspective view of a docking station 400 according to the present invention for retaining an audio device within a car. Importantly, the present invention can be adapted to allow portable audio devices to be integrated with an existing car stereo. The docking station 400 allows such portable devices to be conveniently docked and integrated with the car stereo. The docking station 400 includes a top portion 402 hingedly connected at a rear portion 408 to a bottom portion 404, preferably in a clam-like configuration. A portable audio device 410, such as the SKYFI radio distributed by DELPHI, Inc., is physically and electrically connected with the docking portion 412, and contained within the station 100. A clasp 406 can be provided for holding the top and bottom portions in a closed position to retain the device 410. Optionally, a video device could also be docked using the docking station 400, and tabs 413 can be provided for holding the docking station 400 in place against a portion of a car. Conceivably, the docking station 400 could take any form, such as a sleeve-like device for receiving and retaining a portable audio device and having a docking portion for electrically and mechanically mating with the audio device.

Figure 7B:
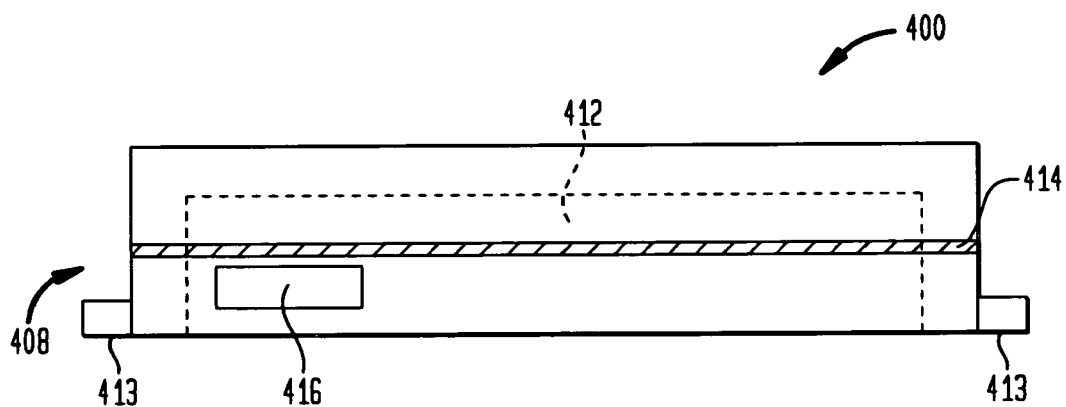

FIG. 7*b* is an end view showing the rear portion 408 of the docking station 400 of FIG. 7*a*. A hinge 414 connects the top portion and the bottom portions of the docking station 400. A data port 416 is provided for interfacing with the audio device docked within the station 400, and is in electrical communication therewith. In a preferred embodiment of the present invention, the data port 416 is an RS-232 serial or USB data port that allows for the transmission of data with the audio device, and which connects with the audio device integration system of the present invention for integrating the audio device with an OEM or after-market car stereo. Any known bus technology can be utilized to interface with any portable audio or video device contained within the docking station 400, such as FIREWIRE, D2B, MOST, CAN, USB/USB2, IE Bus, T Bus, I Bus, or any other bus technology known in the art.

Having thus described the invention in detail, it is to be understood that the foregoing description is not intended to limit the spirit and scope thereof. What is desired to be protected by Letters Patent is set forth in the appended claims.

What is claimed is:

1. An audio device integration system comprising:
a first connector electrically connectable to a car stereo;
a second connector electrically connectable to an after-market audio device external to the car stereo;
a third connector electrically connectable to one or more auxiliary input sources external to the car stereo and the after-market audio device;
an interface connected between said first and second electrical connectors for channeling audio signals to the car stereo from the after-market audio device, said interface including a microcontroller in electrical communication with said first and second electrical connectors, said microcontroller pre-programmed to execute:
a first pre-programmed code portion for remotely controlling the after-market audio device using the car stereo by receiving a control command from the car stereo through said first connector in a format incompatible with the after-market audio device, processing the received control command into a formatted command compatible with the after-market audio device, and transmitting the formatted command to the after-market audio device through said second connector for execution by the after-market audio device;
a second pre-programmed code portion for receiving data from the after-market audio device through said second connector in a format incompatible with the car stereo, processing the received data into formatted data compatible with the car stereo, and transmitting the formatted data to the car stereo through said first connector for display by the car stereo; and
a third pre-programmed code portion for switching to one or more auxiliary input sources connected to said third electrical connector.

2. The apparatus of claim 1, wherein the car stereo further comprises an Original Equipment Manufacturer (OEM) car stereo connected to said first electrical connector.

3. The apparatus of claim 1, wherein the car stereo further comprises an after-market car stereo connected to said first electrical connector.

4. The apparatus of claim 1, wherein the after-market audio device further comprises a CD player, CD changer, MP3 player, Digital Audio Broadcast (DAB) receiver, or satellite receiver connected to said second electrical connector.

5. The apparatus of claim 1, wherein said interface further comprises a plug-and-play mode for automatically detecting a device type of the after-market audio device connected to said second electrical connector and integrating the after-market audio device based upon the device type.

6. The apparatus of claim 1, wherein said interface generates a device presence signal for maintaining the car stereo in a state responsive to processed data and audio signals.

7. The apparatus of claim 1, wherein said second pre-programmed code portion processes data generated by the after-market audio device including track and time information.

8. The apparatus of claim 1, wherein said second pre-programmed code portion processes data generated by the after-market audio device including song title and artist information.

9. The apparatus of claim 1, wherein said second pre-programmed code portion processes data generated by the after-market audio device including channel number and channel name information.

10. The apparatus of claim 1, wherein said interface processes video information generated by the after-market audio device.

11. The apparatus of claim 1, wherein the formatted data is displayed as a menu on a display of the car stereo.

12. The apparatus of claim 11, wherein the display comprises a graphic panel.

13. The apparatus of claim 1, wherein commands are input by a user using one or more control buttons or presets on the car stereo.

14. The apparatus of claim 1, wherein audio signals from the one or more auxiliary input sources are selectively channeled to the car stereo by said interface.

15. The apparatus of claim 1, wherein a user can select between the one or more auxiliary input sources by depressing keys on the car stereo.

16. The apparatus of claim 1, wherein a user can select one of the auxiliary input sources by entering a disc number at the car stereo.

17. The apparatus of claim 1, wherein a user can select one of the auxiliary input sources by entering a track number at the car stereo.

18. The apparatus of claim 1, wherein a user can select one of the auxiliary input sources by entering both disc and track numbers at the car stereo.

19. The apparatus of claim 1, wherein a user can select between the audio device and the one or more auxiliary input sources by entering a sequence at the car stereo.

20. The apparatus of claim 19, wherein the sequence comprises a track up selection followed by a track down selection.

21. The apparatus of claim 1, further comprising a second interface connected to said interface for providing a plurality of auxiliary input sources.

22. The apparatus of claim 21, wherein both said interface and said second interface are controllable using the car stereo.

23. The apparatus of claim 1, further comprising a bus connection established between the after-market audio device and said interface.

24. The apparatus of claim 23, wherein the bus connection comprises a Universal Serial Bus (USB) connection.

25. An audio device integration system comprising:
a first electrical connector connectable to a car stereo;
a plurality of auxiliary electrical connectors connectable to a plurality of auxiliary input sources;
an interface connected between said first electrical connector and said plurality of auxiliary electrical connectors for channeling audio from at least one of the plurality of auxiliary input sources to the car stereo, said interface including a microcontroller in electrical communication with said first electrical connector and said plurality of auxiliary electrical connectors, said microcontroller pre-programmed to execute:
  a first pre-programmed code portion for remotely controlling at least one of the plurality of auxiliary input sources using the car stereo by receiving a control command from the car stereo through said first electrical connector in a format incompatible with at least one of the plurality of auxiliary input sources, processing a received control command into a formatted control command compatible with at least one of the plurality of auxiliary input sources, and transmitting a formatted control command to at least one of the plurality of auxiliary input sources through at least one of said plurality of auxiliary electrical connectors for execution by at least one of the plurality of auxiliary input sources;
  a second pre-programmed code portion for receiving data from at least one of the plurality of auxiliary input sources through at least one of the said plurality of auxiliary electrical connectors in a format incompatible with the car stereo, processing the received data into formatted data compatible with the car stereo, and transmitting the formatted data to the car stereo through said first electrical connector for display by the car stereo; and
  a third pre-programmed code portion for selecting one of the plurality of auxiliary input sources from the car stereo.

26. The apparatus of claim 25, wherein the third pre-programmed code portion for selecting one of the plurality of auxiliary input sources processes a disc or track selection entered by a user using control buttons of the car stereo to select one of the plurality of auxiliary input sources.

27. The apparatus of claim 25, wherein at least one of the plurality of auxiliary input sources comprises a CD player, CD changer, MP3 player, satellite receiver, or a Digital Audio Broadcast (DAB) receiver connected to one of said plurality of auxiliary electrical connectors.

28. The apparatus of claim 25, wherein a device type of at least one of the plurality of auxiliary input sources is automatically detected by said interface and at least one of the plurality of auxiliary input sources is automatically integrated with the car stereo based upon the device type.

29. The apparatus of claim 24, wherein the interface is switchable into an auxiliary input mode by issuing a control sequence at the car stereo.

30. The apparatus of claim 29, wherein the control sequence comprises a track up command followed by a track down command.

31. The apparatus of claim 25, wherein at least one of the plurality of auxiliary input connectors comprises a bus connection established between at least one of the plurality of auxiliary input sources and said interface.

32. The apparatus of claim 31, wherein the bus connection comprises a Universal Serial Bus (USB) connection.

33. A method for integrating an after-market device with a car stereo comprising:
providing an interface having a first electrical connector connectable to a car stereo, a second electrical connector connectable to an after-market device external to the car stereo, a third electrical connector connectable to an auxiliary input source, and a pre-programmed microcontroller positioned within said interface;
connecting said first electrical connector to the car stereo, said second electrical connector to the after-market device external to the car stereo, and said third electrical connector to the auxiliary input source external to the car stereo and the after-market device;
remotely controlling the after-market device using the car stereo by:
  receiving control commands from the car stereo at the interface through said first electrical connector in a format incompatible with the after-market device; and
  processing the control commands into formatted control commands compatible with the after-market device using a first pre-programmed code portion pre-programmed into and executed by said microcontroller and dispatching the formatted control commands to the after-market device through said second electrical connection;
receiving data in a format incompatible with the car stereo through said second electrical connector and audio from the after-market device at the interface;
processing the data into formatted data compatible with the car stereo using a second pre-programmed code portion pre-programmed into and executed by the microcontroller and dispatching the audio and formatted data to the car stereo through said first electrical connector;
displaying the formatted data on the car stereo and playing the audio through the car stereo; and
playing audio from the after-market device through the car stereo.

34. The method of claim 33, wherein the step of receiving data from the device comprises retrieving CD track and time information from the device.

35. The method of claim 33, wherein the step of receiving data from the device comprises retrieving MP3 song, title, track, and time information from the device.

36. The method of claim 33, wherein the step of receiving data from the device comprises retrieving channel number, channel name, artist, and song information from the device.

37. The method of claim 33, wherein the step of receiving data from the device comprises retrieving video information from the device.

38. The method of claim 33, wherein the step of displaying the formatted data comprises displaying the data in an LCD panel.

39. The method of claim 33, wherein the step of displaying the formatted data comprises displaying the data in a graphical user interface at the car stereo.

40. The method of claim 33, wherein the step of displaying formatted data comprises displaying video at the car stereo.

41. The method of claim 33, wherein the step of connecting the after-market device to said second electrical connector comprises connecting a CD player, CD changer, MP3 player, satellite receiver, or a Digital Audio Broadcast (DAB) receiver to said second electrical connector.

42. The method of claim 33, further comprising receiving a selection command from the car stereo and channeling data and audio from the auxiliary input source to said interface in response to the selection command.

43. The method of claim 42, further comprising processing the data from the auxiliary input source for display on the car stereo.

44. An apparatus for docking a portable device for integration with a car stereo comprising:
- a storage area remote from a car stereo for storing the portable device;
- a docking portion within the storage area for communicating and physically mating with the portable device;
- a data port in communication with the docking portion, the data port connectable with a device for integrating the portable device with the car stereo; and
- an interface connected to said data port and to the car stereo, said interface channeling audio from the portable device to the car stereo said interface including a microcontroller in electrical communication with the portable device through said data port and the car stereo, said microcontroller pre-programmed to execute first program code for remotely controlling the portable device using the car stereo by processing control commands generated by the car stereo in a format incompatible with the portable device into formatted control commands compatible with the portable device, and dispatching formatted control commands to the portable device for execution thereby.

45. The apparatus of claim 44, wherein said storage area further comprises a top member, a bottom member, and a hinge, interconnecting said top member and said bottom member at an edge thereof 46. The apparatus of claim 45, further comprising a clasp for retaining said top and bottom members in a closed position.

47. The apparatus of claim 44, wherein the data port comprises an RS-232 or Universal Serial Bus (USB) port.

48. The apparatus of claim 44, wherein the storage area further comprises a top portion and a bottom portion defining a sleeve for holding the portable device.

49. A method of integrating an after-market device with an Original Equipment Manufacturer (OEM) or after-market car stereo comprising:
- providing an interface having a first electrical connector, a second electrical connector, and a microcontroller positioned in said interface and in electrical communication with said first and second electrical connectors;
- connecting the after-market device to said first electrical connector;
- connecting said second electrical connector to the car stereo;
- determining whether the car stereo is an OEM car stereo or an after-market car stereo;
- generating and transmitting a device presence signal to the car stereo using a first code portion pre-programmed into and executed by the microcontroller to maintain the car stereo in an operational state responsive to signals generated by the after-market device, the device presence signal based upon the car stereo; and
- channeling audio signals from the after-market device to the car stereo using said interface.

50. The method of claim 49, further comprising receiving control commands from the car stereo at said interface in a format incompatible with the after-market device.

51. The method of claim 50, further comprising converting the control commands into a format recognizable by the after-market audio device using a second code portion pre-programmed into and executed by the microcontroller.

52. The method of claim 51, further comprising dispatching formatted commands to the after-market audio device for execution thereby.

53. The method of claim 49, further comprising converting data received at the interface from the after-market audio device in a format incompatible with the car stereo into a format compatible with the car stereo using a third code portion pre-programmed into and executed by the microcontroller.

54. The method of claim 53, further comprising displaying formatted data on the car stereo.

55. The method of claim 54, wherein the step of displaying formatted data comprises displaying channel numbers, channel names, titles, tracks, song names, or artist names on the car stereo.

56. The method of claim 54, wherein the step of displaying formatted data comprises displaying video on the car stereo.

57. An audio device integration system comprising:
- a first electrical connector connectable to a car stereo;
- a second electrical connector connectable to a portable MP3 player external to the car stereo
- an interface connected between said first and second electrical connectors for transmitting audio from a portable MP3 player to a car stereo, said interface including a microcontroller in electrical communication with said first and second electrical connectors,
said microcontroller pre-programmed to execute:
- a first pre-programmed code portion for generating a device presence signal and transmitting the signal to the car stereo to maintain the car stereo in an operational state; and
- a second pre-programmed code portion for remotely controlling the MP3 player using the car stereo by receiving a control command from the car stereo through said first electrical connector in a format incompatible with the MP3 player, processing the control command into a formatted control command compatible with the MP3 player, and transmitting the formatted control command to the MP3 player through said second electrical connector for execution by the MP3 player.

58. The apparatus of claim 57, wherein the car stereo further comprises an Original Equipment Manufacturer (OEM) car stereo connected to the first electrical connector.

59. The apparatus of claim 57, wherein the car stereo further comprises an after-market car stereo connected to the first electrical connector.

60. The system of claim 57, wherein said microcontroller is pre-programmed to execute a third code portion for receiving data from the MP3 player in a format incompatible with the car stereo, processing received data into formatted data compatible with the car stereo, and transmitting formatted data to the car stereo for display thereby.

61. The apparatus of claim 60, wherein said third code portion processes data generated by the MP3 player including track and time information.

62. The apparatus of claim 60, wherein said third code portion processes data generated by the MP3 player including song title and artist information.

63. The apparatus of claim 60, wherein commands are input by a user using one or more control buttons or presets on the car stereo.

64. The apparatus of claim 57, further comprising a bus connection established between the MP3 player and said interface.

65. The apparatus of claim 64, wherein the bus connection comprises a Universal Serial Bus (USB) connection.

66. An audio device integration system comprising:
- a first electrical connector connectable to a car stereo;
- a second electrical connector connectable to a satellite radio receiver external to the car stereo;

an interface connected between said first and second electrical connectors for transmitting audio from a satellite radio receiver to a car stereo, the interface including a microcontroller in electrical communication with said first and second electrical connectors, said microcontroller pre-programmed to execute:
  a first pre-programmed code portion for generating a device presence signal and transmitting the signal to the car stereo to maintain the car stereo in an operational state; and
  a second pre-programmed code portion for remotely controlling the satellite radio receiver using the car stereo by receiving a control command from the car stereo through said first electrical connector in a format incompatible with the satellite radio receiver, processing a received control command into a formatted control command compatible with the satellite radio receiver, and transmitting the formatted control command to the satellite radio receiver though said second electrical connector for execution by the satellite radio receiver.

67. The apparatus of claim 66, wherein the car stereo further comprises an Original Equipment Manufacturer (OEM) car stereo connected to said first electrical connector.

68. The apparatus of claim 63, wherein the car stereo further comprises an after-market car stereo connected to said first electrical connector.

69. The system of claim 66, wherein said microcontroller is pre-programmed to execute a third code portion for receiving data from the satellite radio receiver in a format incompatible with the car stereo, processing received data into formatted data compatible with the car stereo, and transmitting formatted data to the car stereo for display thereby.

70. The apparatus of claim 69, wherein said third code portion processes data generated by the satellite radio receiver including track and time information.

71. The apparatus of claim 69, wherein said third code portion processes data generated by the satellite radio receiver including song title and artist information.

72. The apparatus of claim 69, wherein said third code portion processes data generated by the satellite radio receiver including a channel number and a channel name.

73. The apparatus of claim 69, wherein commands are input by a user using one or more control buttons or presets on the car stereo.

74. The apparatus of claim 66, further comprising a bus connection established between the satellite radio receiver and said interface.

75. The apparatus of claim 74, wherein the bus connection comprises a Universal Serial Bus (USB) connection.

76. An audio device integration system comprising:
  a first electrical connector connectable to a car stereo;
  a second electrical connector connectable to a digital audio broadcast receiver external to the car stereo;
  an interface connected between said first and second electrical connectors for transmitting audio from the digital audio broadcast receiver to the car stereo, said interface including a microcontroller in electrical communication with said first and second electrical connectors, said microcontroller pre-programmed to execute:
    a first pre-programmed code portion for generating a device presence signal and transmitting the signal to the car stereo to maintain the car stereo in an operational state; and
    a second pre-programmed code portion for remotely controlling the digital audio broadcast receiver using the car stereo by receiving a control command from the car stereo through said first electrical connector in a format incompatible with the digital audio broadcast receiver, processing a received control command into a formatted control command compatible with the digital audio broadcast receiver, and transmitting the formatted control command to the digital audio broadcast receiver through said second electrical connector for execution by the digital audio broadcast receiver.

77. The apparatus of claim 76, wherein the car stereo further comprises an Original Equipment Manufacturer (OEM) car stereo connected to said first electrical connector.

78. The apparatus of claim 76, wherein the car stereo further comprises an after-market car stereo connected to said first electrical connector.

79. The system of claim 76, wherein said microcontroller is pre-programmed to execute a third code portion for receiving data from the digital audio broadcast receiver in a format incompatible with the car stereo, processing incompatible data into formatted data compatible with the car stereo, and transmitting formatted data to the car stereo for display thereby.

80. The apparatus of claim 79, wherein said third code portion processes data generated by the digital audio broadcast receiver including track and time information.

81. The apparatus of claim 79, wherein said third code portion processes data generated by the digital audio broadcast receiver including song title and artist information.

82. The apparatus of claim 79, wherein said third code portion processes data generated by the digital audio broadcast receiver including a channel number and a channel name.

83. The apparatus of claim 79, wherein commands are input by a user using one or more control buttons or presets on the car stereo.

84. The apparatus of claim 76, further comprising a bus connection established between the digital audio broadcast receiver and said interface.

85. The apparatus of claim 84, wherein the bus connection comprises a Universal Serial Bus (USB) connection.

86. A device for integrating video information for use with a car stereo, comprising:
  a first electrical connector connectable to a car stereo;
  a second electrical connector connectable to an after-market video device external to the car stereo;
  an interface connected between said first and second electrical connectors for transmitting video information from the after-market video device to the car stereo, the interface including a microcontroller in electrical communication with said first and second electrical connectors, said microcontroller pre-programmed to execute:
    a first pre-programmed code portion for generating a device presence signal and transmitting the signal to the car stereo through said first electrical connector to maintain the car stereo in an operational state responsive to signals generated by the after-market video device.

87. The device of claim 86, further comprising means for converting video information into a format compatible with the car stereo.

88. The apparatus of claim 86, further comprising a bus connection established between the video device and said interface.

89. The apparatus of claim 88, wherein the bus connection comprises a Universal Serial Bus (USB) connection.

90. The apparatus of claim 86, wherein said microcontroller is pre-programmed to execute a second code portion for receiving a control signal from the car stereo in a format incompatible with the video device, processing a received control signal into a formatted control signal compatible with the video device, and transmitting the formatted control signal to the video device for execution thereby.

91. The apparatus of claim 90, wherein said microcontroller is pre-programmed to execute a third code portion for receiving data from the video device incompatible with the car stereo, processing received data into formatted data compatible with the car stereo, and transmitting formatted data to the car stereo for display thereon.

92. An audio device integration system comprising:
a car stereo;
a portable audio device external to the car stereo;
an interface connected between the car stereo and the portable audio device, the interface including a microcontroller pre-programmed to execute:
first pre-programmed means for generating a device presence signal and transmitting the signal to the car stereo to maintain the car stereo in an operational state;
second pre-programmed means for remotely controlling the portable audio device using the car stereo by receiving a control command from the car stereo in a format incompatible with the portable audio device, processing the control command into a formatted control command compatible with the portable audio device, and transmitting the formatted control command to the portable audio device for execution thereby; and
means for transmitting audio from the portable audio device to the car stereo.

93. The apparatus of claim 92, wherein the portable audio device comprises a portable CD player.

94. The apparatus of claim 92, wherein the portable audio device comprises a portable MP3 player.

95. The apparatus of claim 92, wherein the portable audio device comprises a portable satellite receiver.

96. The apparatus of claim 92, wherein the portable audio device comprises a portable Digital Audio Broadcast (DAB) receiver.

97. The apparatus of claim 92, wherein the second electrical connector comprises further comprising a bus connection established between the portable audio device and said interface.

98. The apparatus of claim 97, wherein the bus connection comprises a Universal Serial Bus (USB) connection.

99. An audio device integration system, comprising:
a first electrical connector electrically connectable to a car stereo;
a second electrical connector electrically connectable to an after-market, line-level audio source external to the car stereo; and
an interface connected between said first and second electrical connectors for transmitting audio from the after-market, line level audio source to the car stereo, said interface including a microcontroller in electrical communication with said first and second electrical connectors, said microcontroller pre-programmed to execute:
a first pre-programmed code portion for generating and transmitting a device presence signal to the car stereo through said first electrical connector to maintain the car stereo in an operational state responsive to signals generated by the after-market, line-level audio source.

\* \* \* \* \*

UNITED STATES PATENT AND TRADEMARK OFFICE
CERTIFICATE OF CORRECTION

PATENT NO. : 7,489,786 B2
APPLICATION NO. : 10/316961
DATED : February 10, 2009
INVENTOR(S) : Ira Marlowe It is certified that error appears in the above-identified patent and that said Letters Patent is hereby corrected as shown below:

On the Title Page Item (56), on Page 2 of the patent, the spelling of the Inventor's name of U.S. Patent No. 6,005,488 should read "Symanow, et al." instead of "Symanov, et al."

On the Title Page Item (56) in the References Cited Section, on Page 2 of the patent under Other Publications, the fourth reference listed, the website should read "www.venturatechnology.net" instead of "www.venturatechnoogy.net."

On the Title Page Item (56) in the References Cited Section, on Page 2 of the patent under Other Publications, please include the following reference: ""Automedia," magazine pages from Feb. 1999 issue (2 pages)."

On the Title Page Item (56) in the References Cited Section, on Page 2 of the patent under Other Publications, the nineteenth reference listed should read "3 pages" submitted instead of "2 pages."

Column 9, line 3, "USART" should be deleted and replaced with "UART."

Column 10, line 7, "USART" should be deleted and replaced with "UART."

Column 11, line 56, "USART" should be deleted and replaced with "UART."

Column 19, line 39, the second instance of the word "is" should be deleted and replaced with the word "if."

Column 23, line 54, "24" should be deleted and replaced with "25."

Column 27, line 25, "63" should be deleted and replaced with "66."

UNITED STATES PATENT AND TRADEMARK OFFICE
CERTIFICATE OF CORRECTION

PATENT NO. : 7,489,786 B2
APPLICATION NO. : 10/316961
DATED : February 10, 2009
INVENTOR(S) : Ira Marlowe It is certified that error appears in the above-identified patent and that said Letters Patent is hereby corrected as shown below:

Column 30, line 9, the word "comprises" and the word "comprising" should be deleted and replaced with "comprises."

Signed and Sealed this

Seventh Day of April, 2009

JOHN DOLL
*Acting Director of the United States Patent and Trademark Office*